United States Patent
Akiba et al.

(10) Patent No.: US 9,317,788 B2
(45) Date of Patent: Apr. 19, 2016

(54) IMAGE PROCESSING APPARATUS FOR PERFORMING IMAGE PROCESSING FOR RECORDING TEXT AND IMAGES, AND IMAGE PROCESSING METHOD FOR PERFORMING IMAGE PROCESSING FOR RECORDING TEXT AND IMAGES

(71) Applicant: CANON KABUSHIKI KAISHA, Tokyo (JP)

(72) Inventors: Hiromitsu Akiba, Yokohama (JP); Nobutaka Miyake, Yokohama (JP); Shinjiro Hori, Yokohama (JP); Akitoshi Yamada, Yokohama (JP); Fumitaka Goto, Tokyo (JP); Ryosuke Iguchi, Kawasaki (JP); Hidetsugu Kagawa, Kawasaki (JP); Tomokazu Ishikawa, Yokohama (JP); Kouta Murasawa, Yokohama (JP); Junichi Nakagawa, Tokyo (JP); Senichi Saito, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 14/314,978

(22) Filed: Jun. 25, 2014

(65) Prior Publication Data

US 2015/0002902 A1    Jan. 1, 2015

(30) Foreign Application Priority Data

Jun. 26, 2013  (JP) .................................. 2013-133531

(51) Int. Cl.
*G06K 15/02* (2006.01)
*G06K 15/10* (2006.01)

(52) U.S. Cl.
CPC .......... *G06K 15/1814* (2013.01); *G06K 15/102* (2013.01); *G06K 15/1815* (2013.01); *G06K 15/1852* (2013.01)

(58) Field of Classification Search
None
See application file for complete search history.

(56) References Cited

U.S. PATENT DOCUMENTS

| 6,476,925 B2 * | 11/2002 | Nguyen | G06K 15/02 358/1.1 |
| 8,777,343 B2 * | 7/2014 | Ishikawa | G06K 15/107 347/9 |
| 9,030,714 B2 * | 5/2015 | Nakagawa | B41J 2/2132 358/1.9 |
| 2004/0027616 A1 * | 2/2004 | Lapstun | B41J 2/0452 358/2.1 |
| 2009/0079777 A1 * | 3/2009 | Nagamura | B41J 2/205 347/15 |
| 2013/0249989 A1 * | 9/2013 | Iguchi | B41J 2/07 347/15 |

FOREIGN PATENT DOCUMENTS

JP    2003-508827 A    3/2003

\* cited by examiner

*Primary Examiner* — Scott A Rogers
(74) *Attorney, Agent, or Firm* — Canon U.S.A., Inc. IP Division

(57) ABSTRACT

Image ink data is generated which represents the absence of ejection of ink corresponding to pixels for which text ink data represents the ejection of ink.

21 Claims, 22 Drawing Sheets

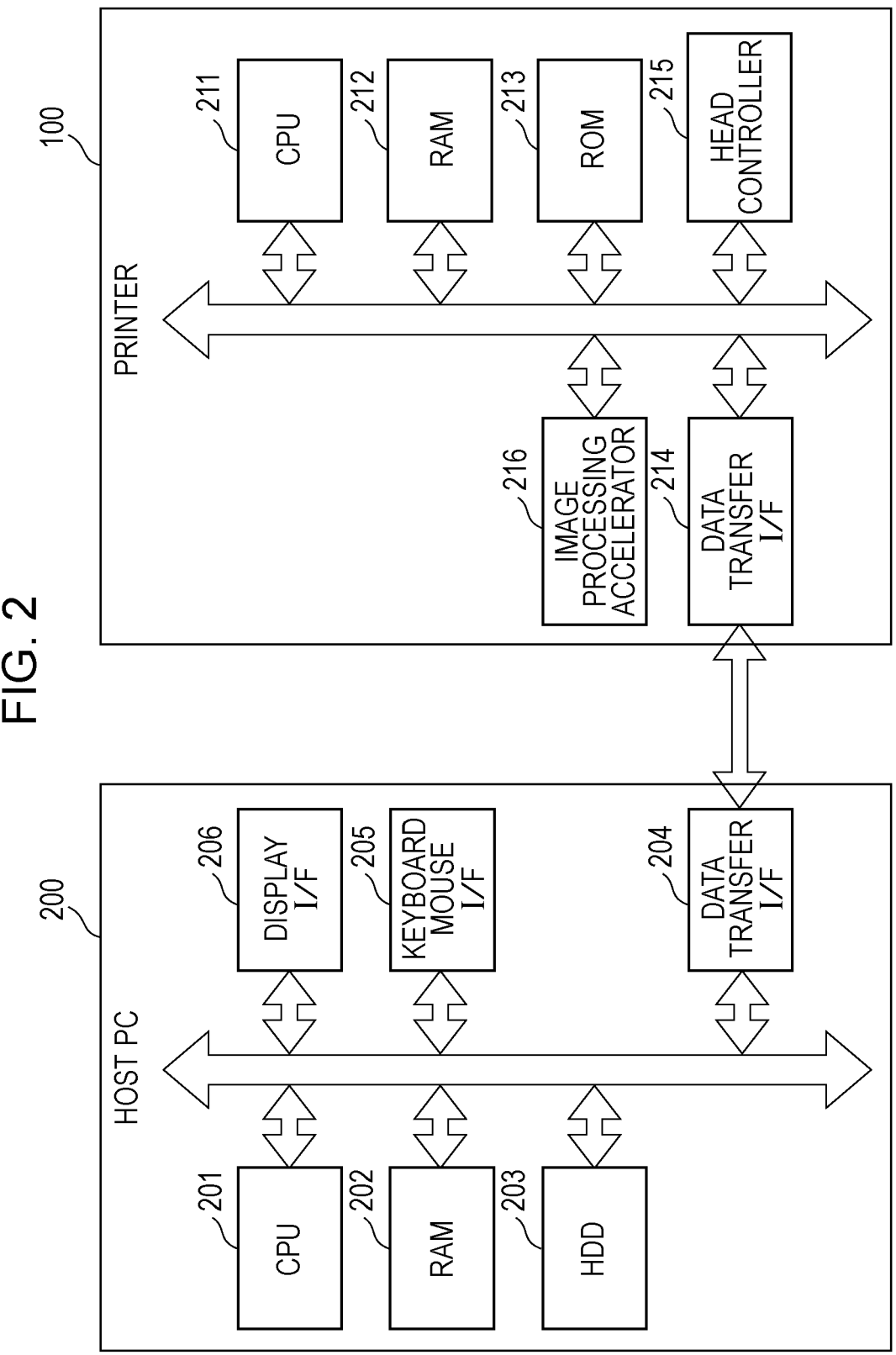

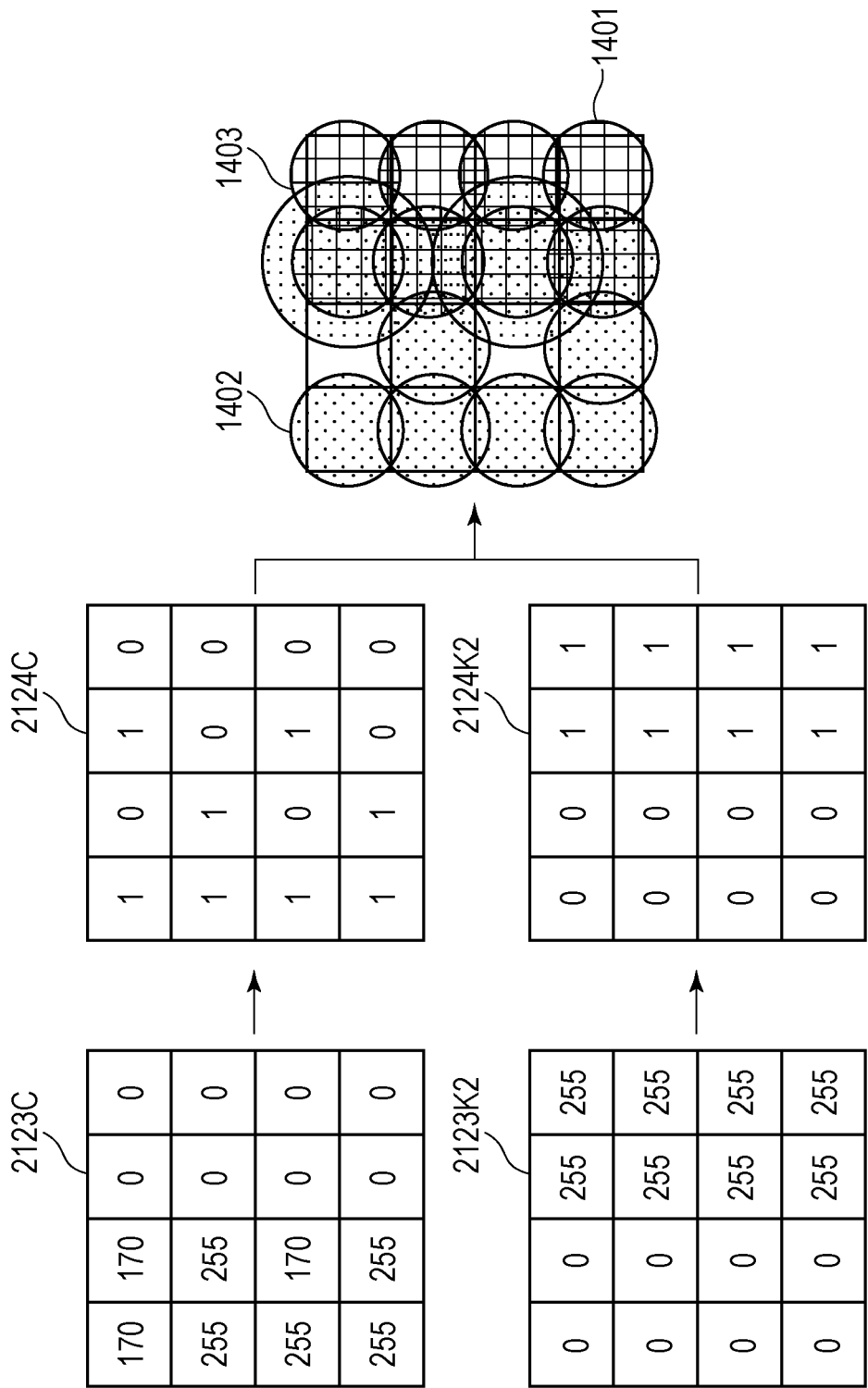

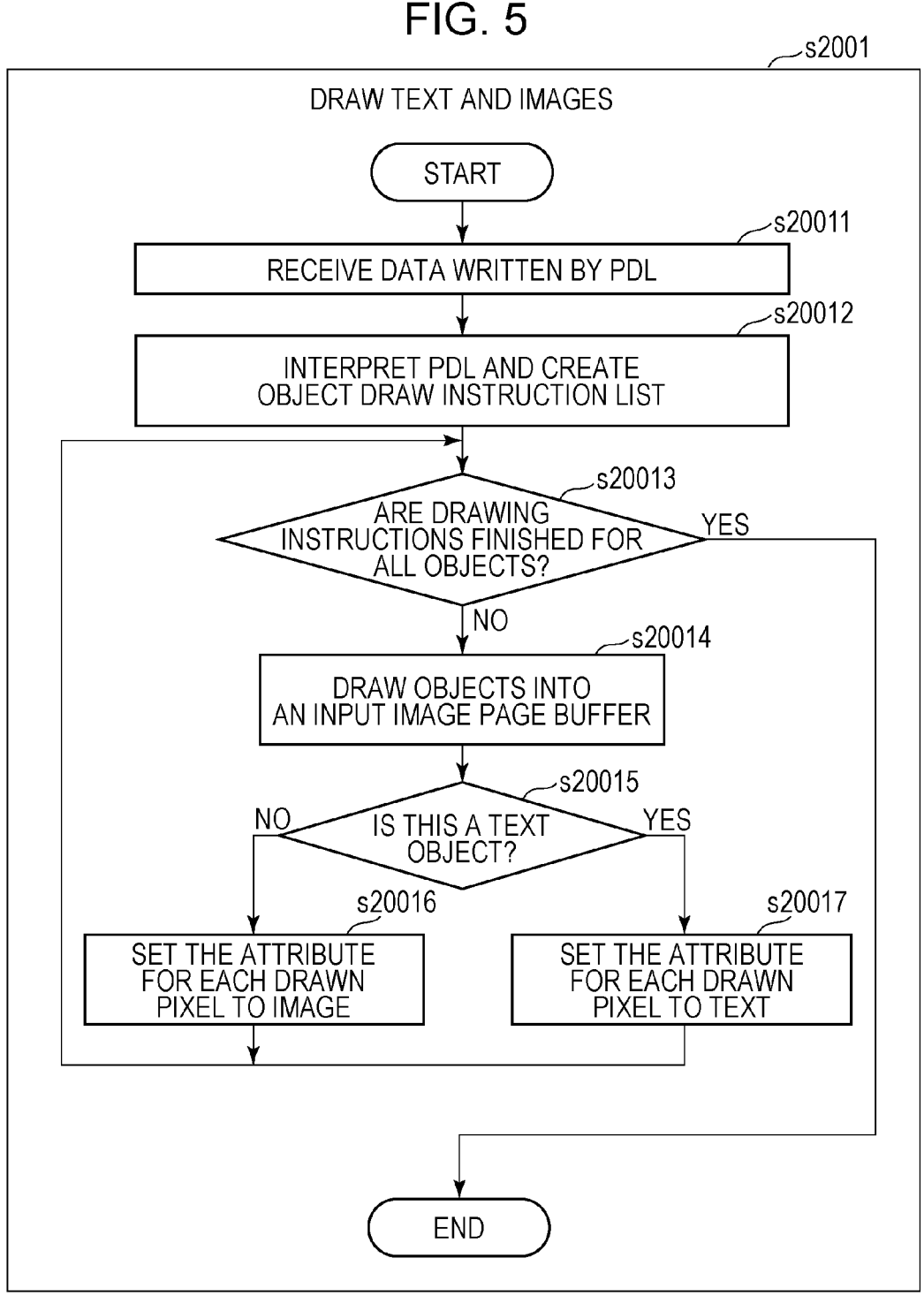

FIG. 8A
FIG. 8B
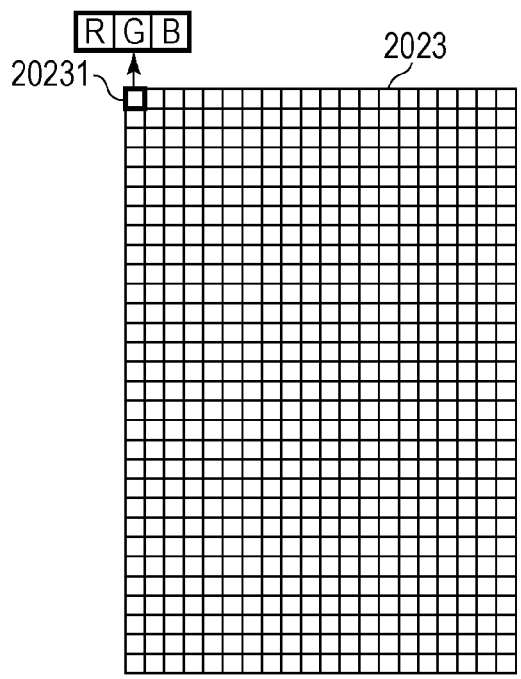
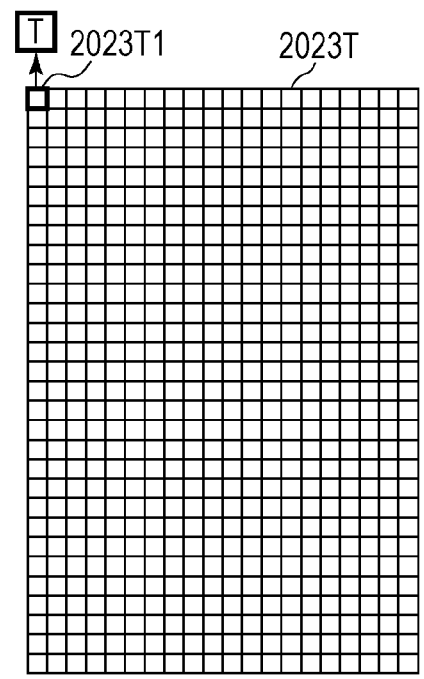

IMAGE PROCESSING APPARATUS FOR PERFORMING IMAGE PROCESSING FOR RECORDING TEXT AND IMAGES, AND IMAGE PROCESSING METHOD FOR PERFORMING IMAGE PROCESSING FOR RECORDING TEXT AND IMAGES

BACKGROUND

1. Field

The present subject matter is related to an image processing apparatus configured to perform image processing for recording text and images and an image processing method thereof.

2. Description of Related Art

Recording text at high resolution is desirable for applications such as business documents, as text quality in recorded images is of significant importance. However, when processing high resolution color images, the amount of image data transferred to a printer increases, which also causes the processing load at the printer for storing and processing this data to increase.

Sometimes, methods are used to transfer multi-value image data from a printer driver to a printer, the printer then generates record data by reducing the gradation level of the multi-value image data, and then form images to a recording media on the basis of the record data having a reduced gradation level. This method has such advantages as being able to distribute the processing on the printer driver side over multiple printers.

PCT Japanese Patent Translation Publication No. 2003-508827 discloses a method in which data corresponding to a black text image unit and data corresponding to a color image unit is divided from input image data, each type of data is compressed and transferred to a printer, and then the printer composites these two types of data.

However, new problems are created when multi-value color image data and multi-value text data transferred to a printer is quantized and then composited according to the technique disclosed in PCT Japanese Translation Patent Publication No. 2003-508827. Specifically, ink dots regarding boundaries of the color image and text overlap, which causes a problem of degrading text quality. This occurs in such cases as when quantization processing is performed on each type of data as a type of error diffusion processing resulting in quantization errors propagating to peripheral pixels, or when the resolution of transferred image data and text is different. This is due to the generation of data representing ejections of ink on pixels which originally had concentration values of zero caused by propagation of quantization errors to peripheral pixels or conversions of resolution. When recording images on a printer on the basis of such text data and image data, images with low text quality are recorded.

SUMMARY

An image processing method claimed performs image processing to record images on a recording medium by generating N-value (N is an integer of 3 or more) text data and M-value (M is an integer of 3 or more) image data on the basis of input data, generating text record data of L values (L is an integer of 2 or more that is less than N) representing the ejection or absence of ejection of ink by quantizing the N-value text data, and generating image record data of K values (K is an integer of 2 or more that is less than M) representing the ejection or absence of ejection of ink by quantizing the M-value image data. The text record data and the image record data are generated so that the image record data indicates no ejection of ink for pixels corresponding to pixels for which the text record data indicates an ejection of ink.

Further features of the present invention will become apparent from the following description of exemplary embodiments with reference to the attached drawings.

BRIEF DESCRIPTION OF THE DRAWINGS

FIG. 2 is a block diagram illustrating a recording system.

FIG. 3 is a diagram describing a problem regarding a first embodiment.

FIG. 5 is a flowchart for an image processing according to the first embodiment.

FIGS. 8A and 8B are diagrams illustrating a page buffer for an image unit and a page buffer for a text unit.

DETAILED DESCRIPTION

Figure 1A:
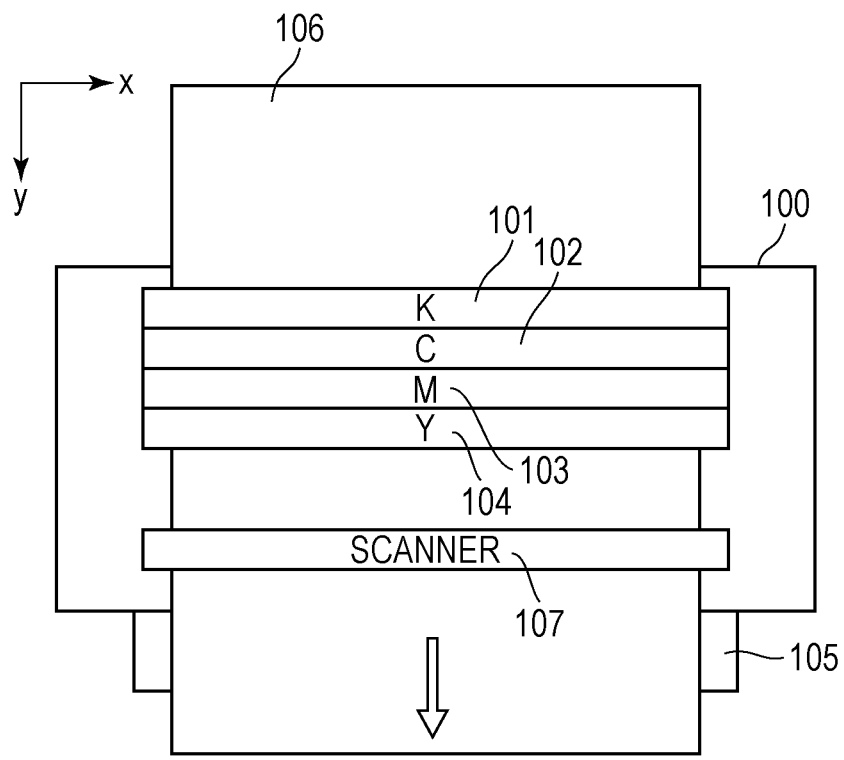
FIGS. 1A and 1B are schematic diagrams of an inkjet printer and recording head.

FIG. 1A is a diagram schematically illustrating an inkjet printer 100, which is a recording apparatus according to the present embodiment. The printer 100 according to the present embodiment is a full line type of printer provisioned with recording heads 101, 102, 103, and 104. The recording heads 101 through 104 eject ink in black (K), cyan (C), magenta (M), and yellow (Y). Multiple nozzles for ejecting ink along the X axis in the figure are arranged at intervals of 1200 dpi.

These recording heads 101 through 104 are aligned together along the Y axis in the figure, and impart ink of multiple colors onto a recording medium 106 conveyed in the direction of the Y axis in the figure to form a color image.

Figure 1B:
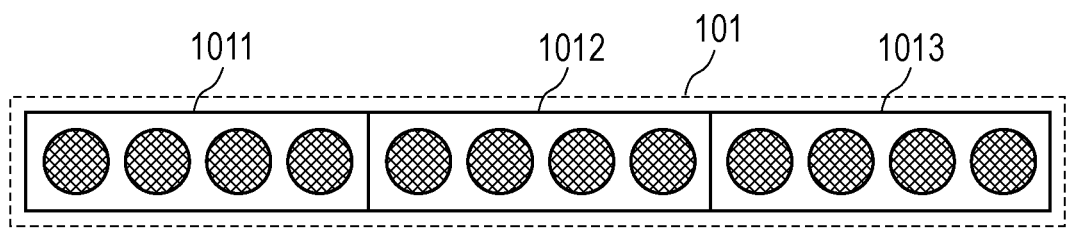

FIG. 1B is a diagram illustrating an arrangement of nozzles regarding the nozzle surface of the recording head 101. As illustrated in the figure, multiple nozzle substrates 1011, 1012, and 1013 are arranged along the X axis in the figure on the recording head 101. Nozzles are arranged along the X axis in the figure on each nozzle substrate, with nozzle rows arranged in four rows along the Y axis.

Returning to FIG. 1A, the recording medium 106 is conveyed in the direction of the Y axis in the figure by rotating a conveyor roller 105 (and other rollers not illustrated) with a motor not illustrated. While the recording medium 106 is conveyed, an operation is performed to eject ink droplets (ink dots) from the nozzles provisioned in each recording head 101 through 104. An image for one page is recorded to the recording medium 106 by controlling the conveying speed of the conveyor roller 105 and the frequency for ejecting ink droplets from the recording head.

A scanner 107 is arranged so as to be parallel to the recording heads 101 through 104 at a position further downstream than the recording heads 101 through 104 regarding the Y axis in the figure. Reading elements are arranged at a predetermined pitch on the scanner 107, which read the image recorded by the recording heads 101 through 104, and output multi-value RGB data.

FIG. 2 is a block diagram illustrating a recording system according to the present embodiment. This recording system is configured with the printer 100 illustrated in FIG. 1 and a host PC 200 as the host apparatus for the printer 100. The host PC 200 includes the following elements. A central processing unit (CPU) 201 executes processing in accordance with a program stored in a random access memory (RAM) 202 or a hard disk drive (HDD) 203, which are storage units. The RAM 202 is volatile storage and temporarily stores programs and data. The HDD 203 is non-volatile storage and similarly stores programs and data. A quantization mask described later is also stored in the HDD 203. A data transfer interface (I/F) 204 controls sending and receiving of data regarding the printer 100. The connection method for the sending and receiving of this data can be universal serial bus (USB), IEEE1394, local area network (LAN), or other. A keyboard and mouse I/F 205 controls human interface devices (HIDs) such as keyboards and mice. The user can input data via this interface. A display I/F 206 controls the display on a display (not illustrated).

Conversely, the printer 100 includes the following elements. A CPU 211 executes processing in accordance with a program stored in a read only memory (ROM) 212 or a RAM 213. The RAM 212 is volatile storage and temporarily stores programs and data. The ROM 213 is non-volatile storage and stores programs and table data used for processing described later. A data transfer I/F 214 controls sending and receiving of data between the host PC 200. A head controller 215 supplied record data to the recording heads 101 through 104 and also controls the ejection operation of the recording heads. Specifically, the head controller 215 reads control parameters and record data from a predetermined address in the RAM 212. After the CPU 211 writes the control parameters and record data to the aforementioned predetermined address in the RAM 212, processing is started by the head controller 215 to eject ink droplets from the record heads.

An image processing accelerator 216 is hardware that can execute image processing faster than the CPU 211. Specifically, the image processing accelerator 216 is configured to read parameters and data necessary for image processing from a predetermined address in the RAM 212. After the CPU 211 writes the control parameters and record data to the aforementioned predetermined address in the RAM 212, the image processing accelerator 216 is started to perform a predetermined image processing on the aforementioned data. According to the present embodiment, image processing for recording including processing by a quantization processing unit is hardware-processed by the image processing accelerator 216. The image processing accelerator 216 is not a required element, and as such, the processing to create the aforementioned table parameters and image processing can be executed by only the CPU 211 depending on the specifications of the printer.

First Embodiment

The degradation of text quality, which is the problem according to the present embodiment, will be described with reference to FIG. 3. FIG. 3 illustrates an example of recording dots of cyan (C) ink from an image unit overlapping with recording dots of black (K) from a text unit.

A data 2123C is 8-bit data representing 256 levels of gradation corresponding to the C ink portion of the image data exhibited by the image unit. The values represent the concentration value (gradation value) of C ink for each pixel. A data 2124C is 1-bit two-value data representing two levels of gradation as the result of quantizing the data 2123C with error diffusion processing. A value of one represents the ejection of C ink for that pixel, and a value of zero represents no ejection of C ink for that pixel. Conversely, a data 2123K2 is 8-bit data representing 256 levels of gradation corresponding to the K ink portion of text data exhibited by the black image unit. The values represent the concentration value of K ink for each pixel. A data 2124K2 is 1-bit data representing two levels of gradation as the result of quantizing the data 2123K2. A value of one represents the ejection of K ink for that pixel, and a value of zero represents no ejection of K ink for that pixel.

Reference numeral 1401 is a diagram illustrating C ink dots 1402 ejected onto the recording medium 106 on the basis of the two-bit data 2124C for C ink and K ink dots 1403 ejected on the basis of the two-bit data 2124K2 for K2 ink. As can be seen from the figure, there are pixels in which the C ink dots and the K ink dots overlap. Referencing the data 2123C and the data 2123K2 again, it is obvious that of the four pixels vertically and four pixels horizontally, the column on the left side of the figure (four pixels vertically and two pixels horizontally) is the image portion, and the column on the right (four pixels vertically and two pixels horizontally) is the text portion. However, regarding reference numeral 1401, overlapping of dots is occurring. This is due to the quantizing the multi-value data of the image portion by error diffusion processing, which propagates errors to peripheral pixels, which causes the generation of data recording C dots in the text portion.

In this way, if dots derived from multi-value image data overlaps with text data dots, the sharpness of the edges of text degrades, resulting in the degradation of text quality such as bleeding and beading.

In addition, if the ink recording the image portion and the ink recording the text portion is permeating ink that can readily permeate the recording medium, image defects due to roller transfer can occur. If dots of permeating ink overlaps on the recording medium, the distance for dots that overlap later to diffuse from the surface to the interior lengthens, which increases the time for full permeation. In this case, if dots that have not fully permeated come into contact with the conveyor roller used to convey the recording medium, ink will be transferred to other coordinates on the recording medium via the conveyor roller.

If the ink for recording the image portion is permeating ink, and the ink for recording the text portion is a type of ink that does not readily permeate but stays on top of the recording medium, image defects due to a decrease in the concentration level of text can occur. If dots of ink that stay on top of the recording medium and dots of permeating ink overlap on the recording medium, the ink that stays on top of the recording medium permeates farther into the interior of the recording medium as compared to the case in which only the ink that stays on top of the recording surface is used, which ultimately results in a local decrease in the concentration level. This phenomenon is referred to as white haze.

According to the present embodiment, image data dots are not recorded on pixels recorded by text data dots in response to the image defects due to the overlapping of text data dots and image data dots on such a recording medium. The processing according to the present embodiment will be described in detail with reference to the flowcharts in FIGS. 4 through 6B.

Figure 4:
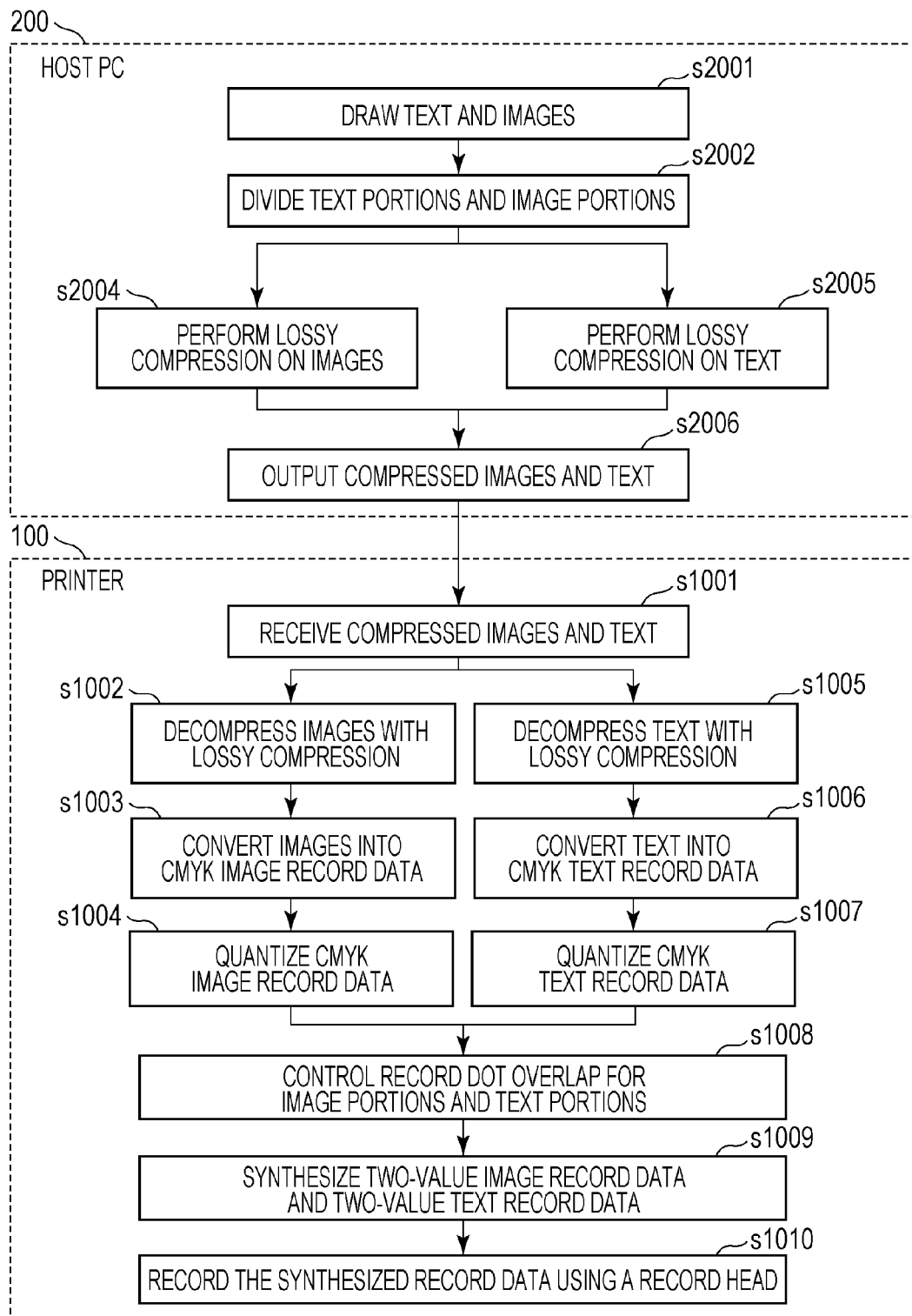
FIG. 4 is a flowchart for an image processing according to the first embodiment.

FIG. 4 is a flowchart illustrating an image processing flow executed by the inkjet print system according to the present embodiment. The host PC and the inkjet printer are the host PC 200 and the printer 100 illustrated in FIG. 2.

The host PC 200 performs processing of steps s2001 through s2006 described next. At step s2001, input image data including text and images is input, and the input image data is drawn (rendered) into a page buffer provisioned in the RAM 202 on the basis of a page description language (PDL). At step s2002, text data and image data is generated by dividing the text portion and image portion from the drawn input image. At step s2004, lossy compression is applied to the image data, and at step s2005, lossless compression is applied to the text data. At step s2006, the compressed image data and text data is sent to the printer 100. There are no restrictions on the order in which the branched processing at steps s2004 and s2005 are performed.

The printer 100 performs the processing for steps s1001 through s1010 described next. At step s1001, the compressed image data and text data is received from the host PC 200. At step s1002, the image data images with lossy compression are rendered. At step s1003, the rendered image data is converted to multi-value CMYK image data corresponding to the ink colors CMYK. At step s1004, the multi-value CMYK image data is quantized by error diffusion processing to generate image record data representing which ink dots to eject and not eject regarding the CMYK colors. At step 1005, the text data with lossless compression is rendered. At step s1006, the rendered text data is converted to multi-value CMYK text data corresponding to the CMYK ink colors. At step s1007, the CMYK text data is quantized to generate text record data representing which ink dots to eject and not eject regarding the CMYK colors. At step s1008, control is performed so that the dots for the image record data and the dots for the text record data for each CMYK color do not overlap. This control method will be described in detail later. At step s1009, the image record data and text record data is composited to generate the composite record data. At step s1010, the ejection of ink from the recording heads is controlled on the basis of the composite record data to record the image on the recording medium. There are no restrictions on how the processing between steps s1002 to s1004 and steps s1005 to s1007 is performed. They can be processed in parallel after the branching from step s1001, or they can be processed in order with one set of processing starting after the other set finishes.

Next, the processing performed at each step will be described in detail. FIG. 5 is an example of processing to draw an input image including text and images on the basis of a page description language (PDL) at step s2001. This description generally refers to the category of PDLs. The actual PDL used can be any existing PDL such as the ones listed next.

PostScript, Portable Document Format (PDF) (product name of Adobe Systems Incorporated)

XML Paper Specification (XPS) (product name of Microsoft Corp.)

At step s20011, data described by the PDL is received. Next, at step s20012, the PDL is analyzed to create a drawing sequence list of object draw instructions. At step s20013, processing ends when there are no more object draw instructions in the list. When there still are object draw instructions, processing proceeds to step s20014. At step s20014, the current draw object is drawn into an input page buffer in the RAM 202. In this case, the draw resolution is the resolution to draw text at the ultimately desired quality. According to the presently-discussed embodiment(s), the drawn image data is 8-bit data representing 256 RGB values. However, the present subject matter is not limited to 8-bit data, and therefore, a larger bit depth of 16 bits, for example, can be used to increase the number of gradation levels.

At step s20015, a determination is made on whether or not the current draw object has a text attribute. According to the present embodiment, black text is determined as an object with the text attribute. Specifically, an object is determined to have the text attribute for pixels satisfying the following conditions.

Determination condition 1: the draw object is not a bitmap image

Determination condition 2: the RGB values for the draw object are all zero

If the object does not have the text attribute, processing proceeds to step s20016, and if the object does have the text attribute, processing proceeds to step s20017. Generally, PDL describes images such as photographs to be drawn as bitmaps, and text objects are described in formats such as vector draw instructions or text codes plus font information. Therefore, attribute information (attribute data) for each pixel can be obtained on the basis of data described by PDL with the aforementioned method. At step s20016, the attribute value for each pixel of the current draw is set to image, and then processing proceeds to step s20013 to begin processing of the next draw object. At step s20017, the attribute value for each pixel of the current draw is set to text, and then processing proceeds to step s20013 to begin processing of the next draw object.

Figure 6A:
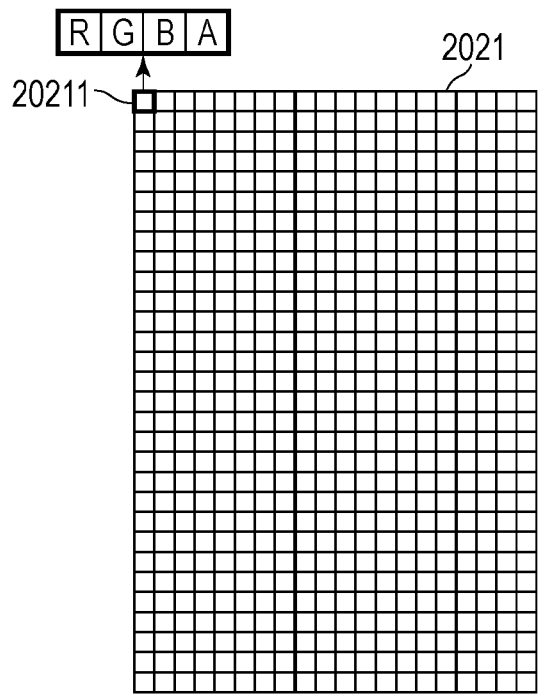
FIGS. 6A through 6C are diagrams illustrating page buffers for input images.

FIG. 6A is a diagram of an input image buffer 2021 set in the RAM 202 of the host PC 200. The input image page buffer 2021 has a region of a predetermined number of vertical image pixels and horizontal image pixels in which the first pixel is a pixel 20211. Each pixel is configured from a red, green, and blue (RGB) value and an attribute value A. RGB values are data representing color coordinates (R, G, B) in a color space such as sRGB, which are representative colors for a monitor. In this case, at the aforementioned step s20014, color information sets the RGB values for each pixel, and at step s20016 or s20017, the attribute value A region is set.

Figure 6B:
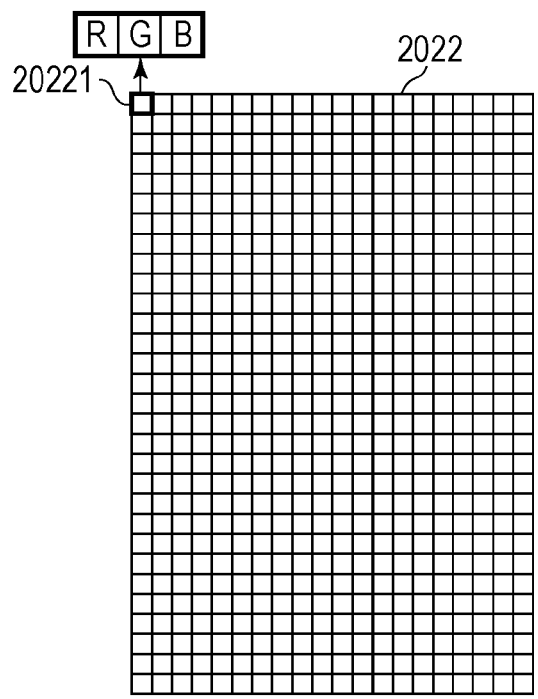
Figure 6C:
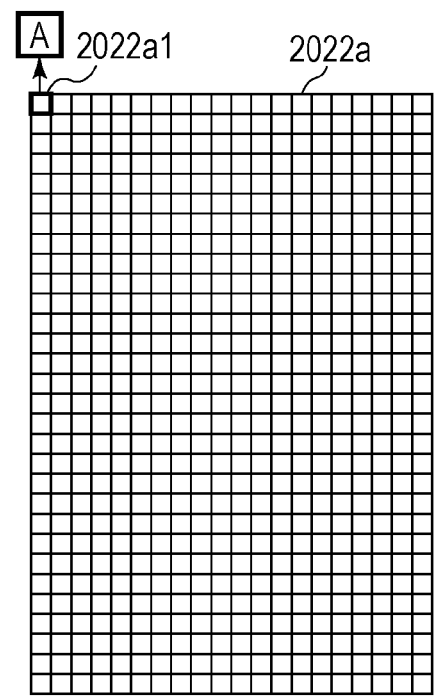

FIGS. 6B and 6C are examples of other input image buffer pages. An input image page buffer 2022 and an attribute value buffer 2022a have regions of a predetermined number of vertical image pixels and horizontal image pixels in which the first pixels are a pixel 20221 and a pixel 2022a1. Each pixel in the input image page buffer 2022 is configured from RGB values, and each pixel in the attribute value buffer 2022a is configured from the attribute value A. In this case, at the aforementioned step s20014, color information is set for the RGB regions of each pixel in the input image page buffer 2022, and at step s20016 or step s20017, the attribute value A is set in the attribute value buffer. Various related implementations are possible such as having individual buffers for each value (R, G, B, and A), and so any of these methods can be used. Using the buffer configuration in FIG. 6A has the advantage of reducing the size of the program, as control is simplified due to only needing one path for address management. When the number of bits representing the attribute value is smaller than the number of bits for the RGB value in the case of the buffer configuration in FIG. 6B, the size of the attribute value buffer in FIG. 6C can be reduced, which reduces the amount of memory used.

Figure 7:
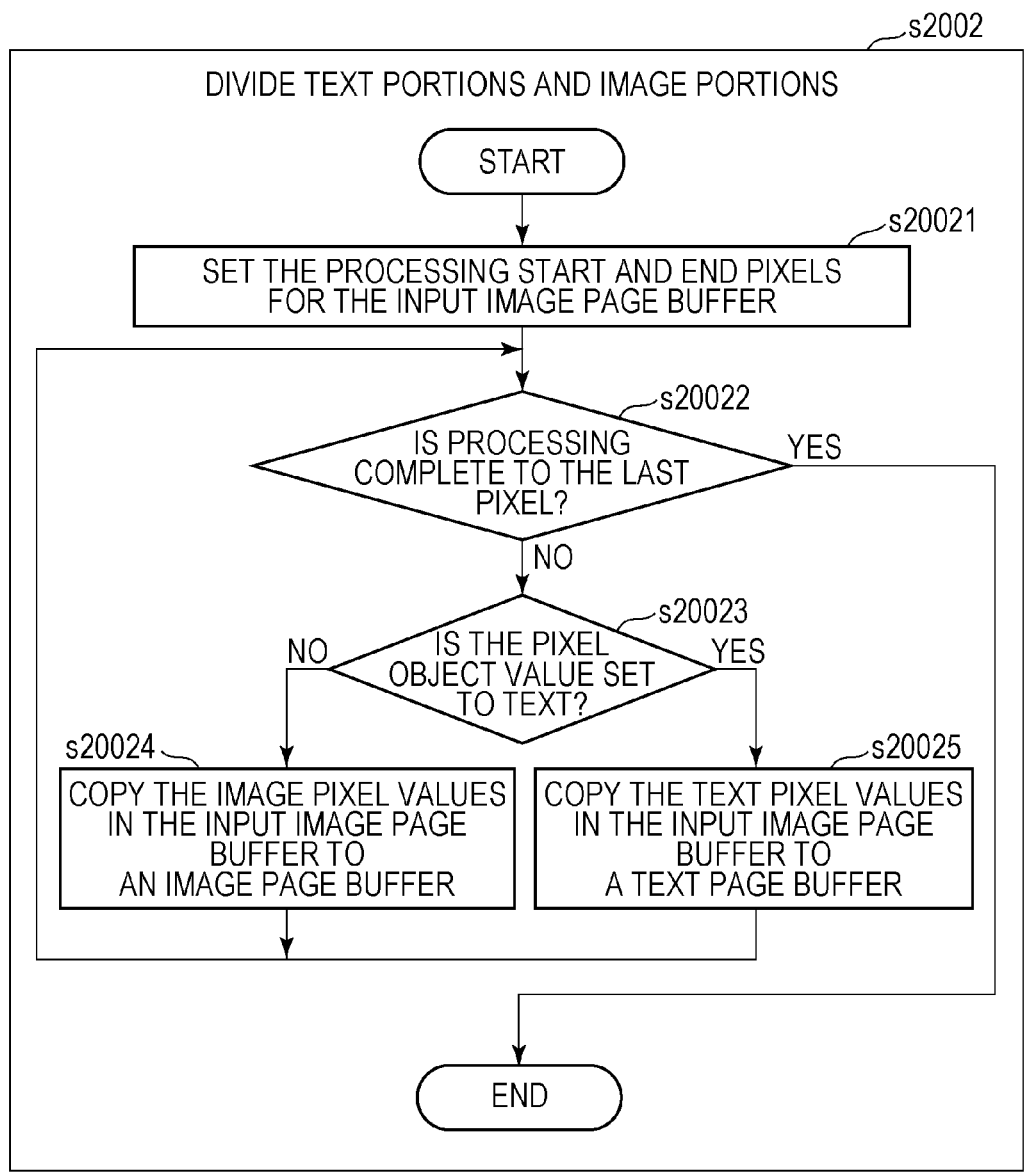
FIG. 7 is a flowchart for an image processing according to the first embodiment.

FIG. 7 illustrates a processing to divide the black text portion and the image portion from input image data at step s2002 to generate text data and image data. First, at step s20021, the processing starting pixel and ending pixel in the input image page buffer is set. At step s20022, a determination is made on whether or not the ending pixel has been reached indicating that there are no more pixels to process. If there are no more pixels to process, processing ends. If there are more pixels to process, processing proceeds to step s20023. At step s20023, a determination is made on whether or not the pixel being processed has the text attribute. If it does not have the text attribute, that is to say, if it has the image attribute, processing proceeds to step s20024. If it does have the text attribute, processing proceeds to step s20025. At step s20024, the image pixel value in the input image page buffer is copied to the corresponding pixel in the image page buffer, and then processing proceeds to step s20022 to perform the processing on the next pixel. At step s20025, the text pixel value in the input image page buffer is copied to the corresponding pixel in the text page buffer, and processing proceeds to step s20022 to perform the processing on the next pixel.

FIGS. 8A and 8B are diagrams illustrating an image page buffer and text page buffer set in the RAM 202 of the host PC 200 regarding step s2002. An image page buffer 2023 and a text page buffer 2023T have the same regions of horizontal image pixels and vertical image pixels as the image page buffer 2023, in which the first pixels are a pixel 20231 and a pixel 2023T1. Each pixel in the image page buffer 2023 is configured from RGB values, and each pixel in the text page buffer 2023T is configured from a text information T. In this case, at the aforementioned step s20024, color information sets the RGB values of each pixel in the image page buffer 2023, and at step s20025, the text information T is set in the text page buffer 2023T.

According to the present embodiment, the text information T in the text page buffer 2023T can be represented by a smaller number of bits than that for the RGB values. This is because the text information T is set in the text page buffer 2023T after the RGB values for the pixel in the input image page buffer have been determined to all be zero (R=G=B=0) due to the determination condition 2 used for determining whether or not an object is a text object at step s20015. Therefore, this can expressed with either a zero or a one, and so only needs to be 1-bit data.

Returning to FIG. 4, the processing to compress the data and send it to the printer 100 and the processing performed at the printer 100 will be described.

At step s2004, the image data generated at step s2002 is compressed with lossy compression. According to the present embodiment, the Joint Picture Expert Group (JPEG) format is used, but any compression format can be used. The reason for selecting a lossy compression format is because loss of detail is not as noticeable as compared with text. Furthermore, compression processing is not required to implement the present subject matter.

At step s2005, the text data generated at step s2002 is compressed with lossless compression. According to the present embodiment, the Run Length (RL) compression format is used, but any compression format can be used. The reason for using a lossless compression format is because there is a greater need to recreate detail for text than for images. As with step s2004, the configuration does not have to include the compression processing. According to the present embodiment, black text is determined as a text object, and the text information T for each pixel configuring the text page buffer 2023T is 1-bit data, which makes the amount of data at least ¼ as that for the RGB data. For this reason, depending on the balance between printer speed and transfer speed, it may not be necessary to perform compression.

At step s2006, the compressed image data and text data is sent to the printer 100. By using a lossless compression format for the image portion and a lossy compression format for the black text portion, it may also be possible to maintain the black text quality while reducing the amount of data transferred. In this way, images and text are separate types of data, which enables a configuration applying the preferable compression format to each type of data.

At step s1001, the compressed image data and text data is received from the host PC 200. The received image data is rendered at step s1002, and the compressed text data is rendered at step s1005. If compression processing is not performed at the host PC 200, step s1002 is skipped for image data, and processing proceeds to step s1003. Step s1005 is skipped for text data, and processing proceeds to step s1006.

At step s1002, the image data with lossy compression is rendered. In this case, the rendering method corresponds to the lossy compression format used at step s2004 performed by the host PC 200. According to the present embodiment, the data compressed in the JPEG format is decoded. The decoded data is stored in the image buffer (not illustrated) in the RAM 212 in the printer 100 in the same format as that for the image buffer 2022 illustrated in FIG. 6B.

At step s1003, the image data rendered at step s1002 is converted into multi-value CMYK image data corresponding to the ink colors of the printer 100 (ink color analysis processing). Pixel values in the image data (RGB) values are data representing color coordinates (R, G, B) in a color space such as sRGB, which are representative colors for a monitor. This data is converted into the multi-value concentration level data corresponding to the ink colors of the printer (CMYK) by using a well-known method such as matrix calculation processing or three-dimensional look-up table (LUT). The printer 100 according to the present embodiment uses ink in colors of cyan (C), magenta (M), yellow (Y), and black (K), and so the RGB signal image data is converted into image data in which each color C, M, Y, and K has an 8-bit color signals with 256 values. To increase the color reproduction range and create a higher quality color image, values are typically set so that the dots record to the maximum amount that can be accepted by the recording medium. This can be optimized to reduce the amount from this maximum while still preventing any occurrence of image defects. The example given for the ink included the four colors CMYK, but the number of colors may be increased to improve image quality such as ink with lighter concentration levels including light cyan (Lc), light magenta (Lm), and gray (Gy), or particular color ink such as red (R), green (G), and blue (B).

Figure 9A:
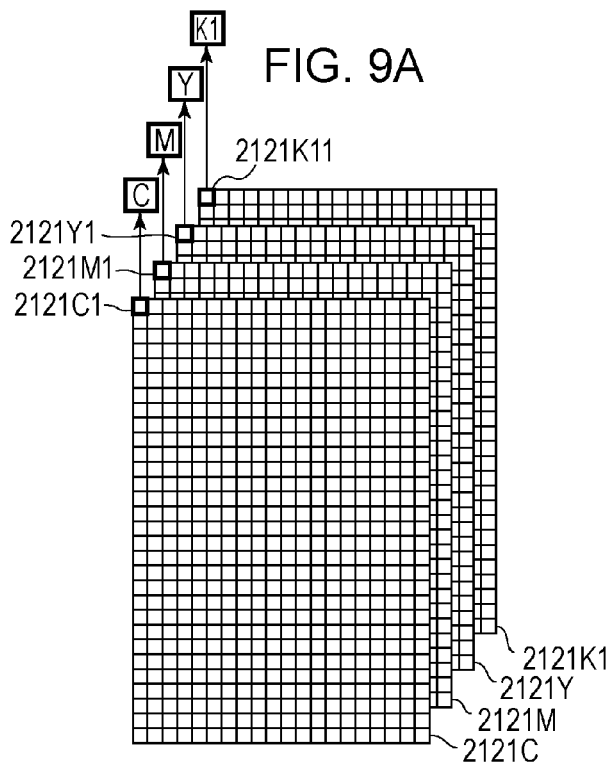
FIGS. 9A through 9D are diagrams illustrating an ink color page buffer for an image unit and an ink color page buffer for a text unit.
Figure 9C:
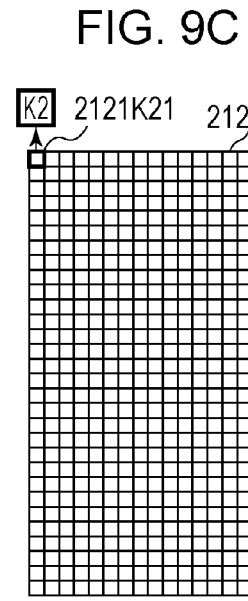

FIG. 9A illustrates a CMYK ink color concentration level buffer for image portions and FIG. 9C illustrates a K ink color buffer for text portions set in the RAM 212 in the printer 100. The CMYK ink color concentration level buffer for image portions is configured with a C ink color concentration level buffer 2121C, an M ink color concentration level buffer 2121M, a Y ink color concentration level buffer 2121Y, and a K ink color concentration level buffer 2121K. The first pixel in the C ink color concentration level buffer 2121C is set to a pixel 2121C1, and each pixel is set with a concentration level value for C ink. This applies in the same way for the M ink, Y ink, and K ink. These four ink color concentration level buffers all have the same regions of vertical image pixels and horizontal image pixels as the image page buffer 2023. Each pixel is represented by 8-bit multi-value information with 256 values. Pixels have a one-to-one correspondence, and so the RGB data for the first pixel 20231 of the image page buffer 2023 in FIG. 8A is converted into CMYK ink color data at step s1003, and the converted results are stored as pixels 2121C1, 2121M1, 2121Y1, and 2121K11 as in FIG. 9A. This applies in the same way for the other pixels.

At step s1004, the CMYK image data corresponding to the image portion is quantized. As a result, the gradation is reduced to generate two-value CMYK image record data. According to the present embodiment, quantization is performed by error diffusion processing.

Figure 9B:
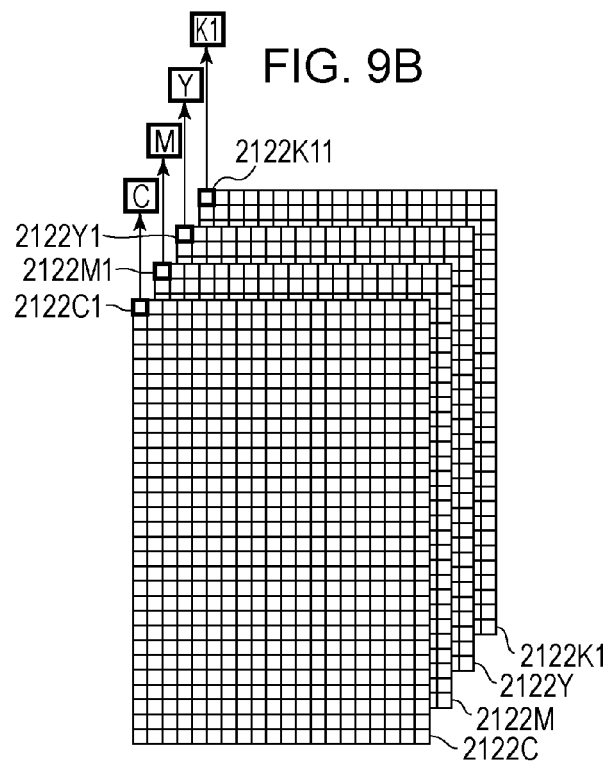
Figure 9D:
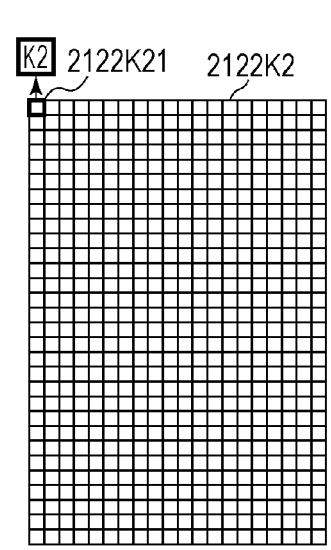

FIG. 9B illustrates a CYMK ink data buffer for image portions and FIG. 9D illustrates a K ink data buffer for text portions set in the RAM 212 in the printer 100. The CMYK ink data buffer for image portions is configured with a C ink data buffer 2122C, an M ink data buffer 2122M, a Y ink data buffer 2122Y, and a K ink data buffer 2122K. The first pixel in the C ink data buffer 2122C is set to a pixel 2122C1, and each pixel is set with information representing to eject or not eject C ink. This applies in the same way for the M ink, Y ink, and K ink. These four ink data buffers all have the same regions of vertical image pixels and horizontal image pixels as the binary image page buffer 2021. Each pixel in these ink data buffers corresponds to each nozzle on the recording head.

At step s1005, the text data compressed with lossless compression is rendered to generate text data. In this case, the rendering method corresponds to the lossless compression format used at step s2005 performed by the host PC 200. According to the present embodiment, data compressed in the RL format is decoded. The decoded data is stored in the text page buffer (not illustrated) in the RAM 212 in the printer 100.

At step s1006, the text data is converted to K multi-value text data. According to the present embodiment, the text data represents R=G=B=0 for the color space coordinates such as for sRGB, which are representative colors for a monitor. This data is converted into the K ink color concentration level data of the printer (K) by using a well-known method such as matrix calculation processing or one-dimensional LUT. To increase the black text concentration level, values are typically set so that the dots record to the maximum amount that can be accepted by the recording medium. This can be optimized to reduce the amount from this maximum while still preventing any occurrence of image defects. The example given for the ink included the one color K, but the number of colors may be increased to improve image quality such as ink with lighter concentration levels such as gray (Gy).

A K ink color buffer 2121K2 for text portions in FIG. 9C has the same regions of vertical image pixels and horizontal image pixels as the input image page buffer, and the first pixel is a pixel 2121K21. The text information T for the first pixel 2023T1 in the text page buffer 2023T illustrated in FIG. 8B is converted into a multi-value K ink color data at step s1006, and the converted result is stored in as the pixel 2121K21 as in FIG. 9C. The text information T is either 0 or 255, and so the post-conversion K ink color data is 8-bit multi-value data with 256 values. In this way, a preferable amount of ink used on the recording medium can be controlled by multi-value controlling of the concentration level of the K ink for text portions.

At step s1007, the K ink color data is quantized to generate the K text record data. If text data is divided (generated) as 1-bit data with two values at step s2002, this is stored as 1-bit data with two values is stored until step s1006, and so the processing to lower the number of gradations to two is not necessary, in which case step s1007 can be omitted. When dividing objects with text attributes other than simple black text (R=G=B=0) as a text portion, CMYK record data of at least two bits representing a number of gradations of at least three is generated at step s1006, and so quantization will be necessary here, which will be described in detail later. In this case, overlapping of the recording dots will occur as quantization using error diffusion processing is performed for either or both the image portion during step s1004 and the text portion at step s1007. Typically, error diffusion processing produces a higher quality image recording than dithering.

Next, at step s1008, the CMYK record data for the image portion is controlled on the basis of the CMYK record data for the image portion and the K record data for the text portion so that recording dots do not overlap.

Figure 10:
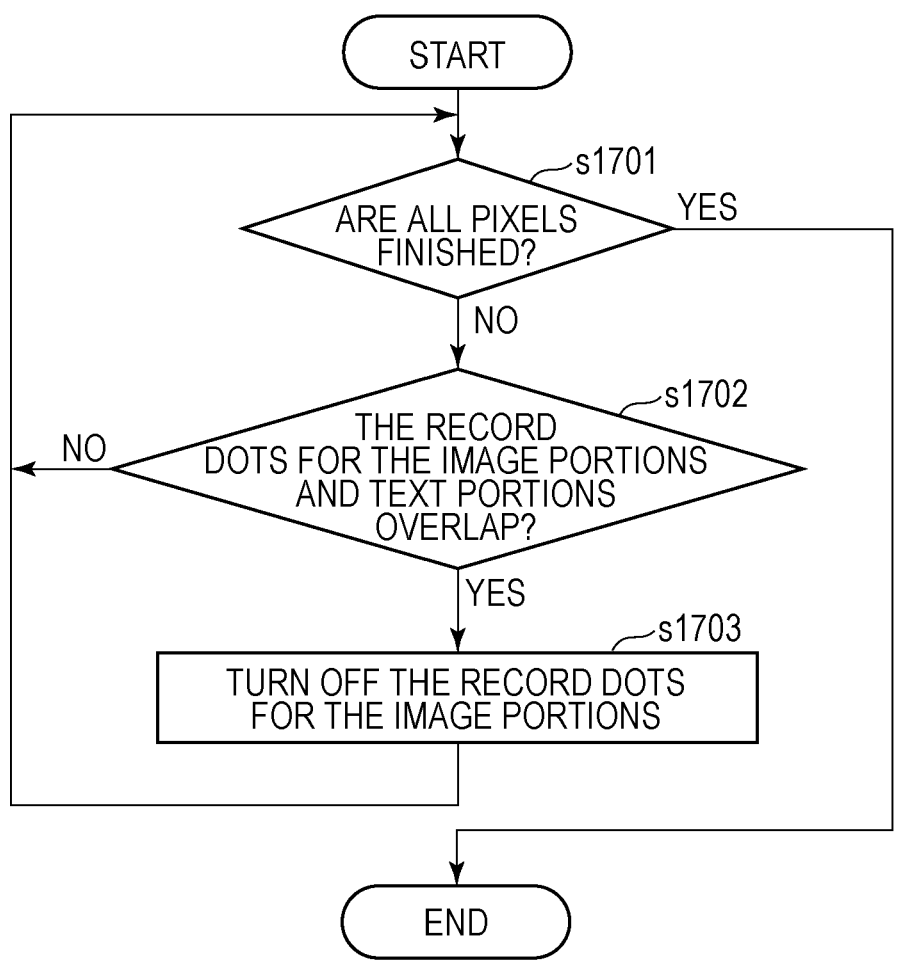
FIG. 10 is a flowchart for an image processing according to the first embodiment.
Figure 11A:
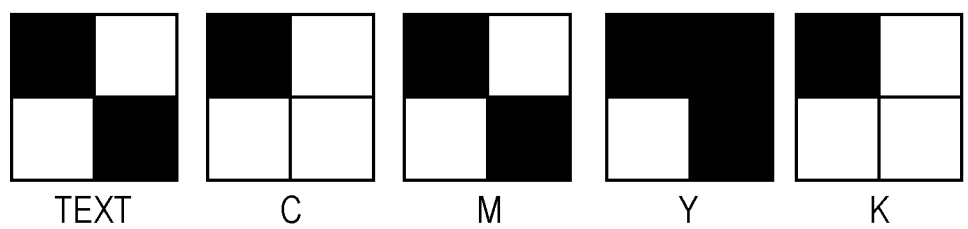
FIGS. 11A and 11B are diagrams illustrating overlap control of dots according to the first embodiment.

FIG. 10 is a flowchart illustrating processing to mutually reference the record data for the image portion and the record data for the text portion and effect control so that recording dots do not overlap, in step s1008. At step s1701, a determination is made on whether or not the determination for the presence of recording dot overlap made for all pixels regarding the CMYK record data for the image portion and the K record data for the text portion has ended. At step s1702, a determination is made on whether or not the recording dot has overlap of the image portion and the text portion. FIG. 11A illustrates a recording dot pattern of K ink pixels for the text portion in a 2×2 configuration and a recording dot pattern of CYMK ink pixels for the image portion in a 2×2 configuration. The black pixels represent recording dots that are on (ejecting), and the white pixels represent recording dots that are off (not ejecting). When determining the upper-left pixel from the pixels in the 2×2 configuration, this pixel is on for the text portion and for all colors (CMYK) for the image portion, and so the recording dot is determined as having overlap.

Figure 11B:
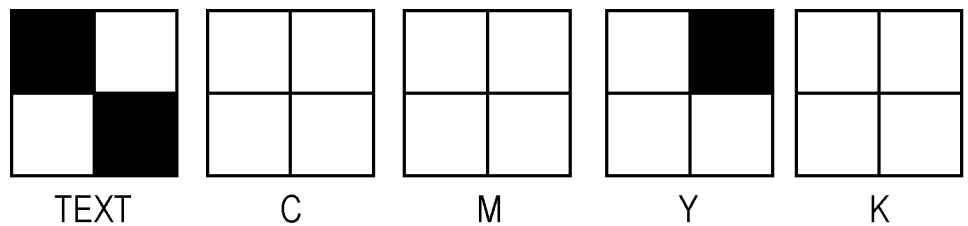

At step s1703, the recording dot for the image portion is turned off for pixels in which the recording dot is determined as having overlap. For the case of the upper-left pixel in the 2×2 configuration, the recording dot is turned off for all color (CMYK) for the image portion. If the steps s1702 and s1703 are repeated, the processing result resembles that in FIG. 11b regarding the pixels in the 2×2 configuration, which eliminates the recording dot overlap at the image portion and text portion.

Returning to FIG. 4, at step s1009, the image record data for which the overlap was controlled at step s1008 is composited with the text record data to generate the composite record data. Specifically, the CMYK composite record data can be generated by calculating a logical OR operation on data corresponding to the same pixel regarding all the CMYK ink data regarding the image record data and the text record data. According to the present embodiment, the text record data is only K data corresponding to black ink, and so the OR operation is performed on the K data for the text record data and the K data for the image record.

At step s1010, drive control of the recording heads 101 through 104 is performed on the basis of the CMYK composite record data to record the image to the recording medium. According to the present embodiment, the CMYK composite record data is two-value data representing to eject or not eject ink dots.

In this way, according to the present embodiment, degradation of text quality is prevented by controlling the recording dots so as to not have overlap between the image portion and the text portion. In addition, image defects caused by roller transfer and white haze can be reduced.

According to the present embodiment, the example given turns the recording dots off for all colors of the image portion, but the recording dots for only a portion of the colors for the image portion can be turned off as long as it is still possible to reduce image defects. The example given turns off the recording dots for the image portion, but the recording dots for the text portion can be turned off as long as text quality can be maintained and that only one or the other is turned on.

The example given determines whether an object has a black text or image attribute, and then performs different data processing for these two types of objects, but the applicable scope of the present subject matter is not limited to the aforementioned combination, and as such, other parameters and determination conditions can be used. For example, by performing data processing to divide data into single ink color text and images, high quality images can be formed regarding text formed from a single color ink. In this case, the following determination conditions can be set.

Determination condition 1: the draw object is not a bitmap image
Determination condition 2: One of the RGB values for the draw object is 0, and the other two values are 255

In this case, as a prerequisite condition, images must be recorded only in C ink when R=0, and G=B=255, only in M ink when G=0, and R=B=255, or only in Y ink when B=0, and R=G=255. In addition, instead of determining by the RGB values, determinations can be made by the converted CMYK values.

One of the conditions used in determining text is whether or not an object is a bitmap, but the following determination conditions can also be used.

Object is a text object
Object is a vector object
Object is a 1-bit bitmap with two values
The rendering intent in a PDF is colorimetric.

According to the present embodiment, text and images are divided by determining the pixels exhibiting the text attribute as black text with all RGB values of zero, but the present subject matter can also be applied to text other than black text. Next, a configuration to divide color text from data as the text object will be described in detail with reference to the process flow chart in FIG. 4. The portions of processing flow that are the same as that regarding black text will be omitted.

First, the determination condition for step s20015 in FIG. 5 is set to the "Determination condition 1: the draw object is not a bitmap image" as the determination condition when dividing the text portion and image portion at step s2001 in FIG. 4. That is to say, the "Determination condition 2: the RGB values for the draw object are all zero" is not used as a determination condition. Thus, pixels of text of colors other than black are given the text attribute, which is set in the attribute value buffer. Next, when dividing the text portion and the image portion at step s2002, both the image buffer and the text buffer will have a copy of the pixel value. According to the method to determine the previously described black text as text, pixels with all RGB values of zero are determined as text, which enabled the use of a 1-bit text buffer, but in this case, color text is also determined as text, and so the RGB values for each pixel is also copied as 8-bit data. When converting the multi-value CMYK ink color data at step s1006, CMYK data is generated for both types of objects. That is to say, the text buffer in FIG. 9C stores 8-bit multi-value data with 256 values in a C ink color buffer 2121C2, an M ink color buffer 2121M2, and a Y ink color buffer 2121Y2, all omitted from illustration, in addition to the K ink color buffer 2121K2. Next, at step s1007, quantization processing is performed on both sets of CMYK ink color data with 256 values to generate CMYK record data for the image portion and CMYK record data for the text portion by reducing the gradation level. That is to say, ink data buffers for the text portion are created for each CMYK value, which stores data representing to eject or not eject ink.

At step s1008, processing is performed on the CMYK record data for the image portion and the CYMK record data for the text portion so that recording dots do not overlap. In this case, the dots for the image portion as controlled so as not to overlap with the dots for the text portion. For example, if there data stored representing the ejection of ink for even one CYMK color regarding a pixel in the CMYK ink buffer for the text portion, control is performed so that the pixel corresponding to the CMYK record data for the image portion does not become a pixel representing the ejection of ink. That is to say, the data is changed to represent the absence of ejection of ink (recording dot is off). An OR logical calculation for each portion of the CMYK record data for the text portion is used at the method, for example, to generate text ejection data representing the pixels for the text portion to received ink ejections. The recording dots can be turned off for each portion of the CMYK record data for the image portion corresponding to the pixels in the text ejection data for which the recording dot is turned on. In consideration of the composite processing performed later, the recording dots can be turned off for pixels corresponding to other colors of the image CMYK record data that correspond to pixels in the ink data for which the recording dots are turned on regarding the text CMYK record data. For example, if the recording dot is turned on for a pixel in the C ink data for the text portion, the processing turns off the recording dot for the M ink data, the Y ink data, and the K ink data of the image portion. This processing is applied in the same way for the M ink data, the Y ink data, and the K ink data of the text portion. As a result, for every pixel of which C ink is ejected on the basis of the text data, the M ink, Y ink, and K ink based on the image data can be controlled so as not to have ink ejected. As a result, the dots based on the image portion corresponding to the text portion can be controlled so as not to record, which enables degradations in text quality to be prevented.

Second Embodiment

According to the previously described first embodiment, a method was described in which input PDL data is divided into an image portion and a text portion, and CMYK record data is controlled so that image portion recording dots do not overlap with text portion recording dots.

Recently, improvements in the printing speed of printers and increases in the resolution of input images has led to some cases of the time to transfer the data and the time to process the data at the printer to become longer than the time to print the input image. According to the present embodiment, a method will be described to reduce the amount of data transferred between the printer driver and the printer by reducing the resolution of the image portion, and reduce the amount of processing performed by the printer after rendering the data. Black text quality is the most critical factor for business and similar documents, and so there is demand for image recording at higher resolutions. Therefore, according to the present embodiment, the amount data is reduced by lowering the resolution of the image portion data transferred. According to the present embodiment, when the resolution of the image portion and the text portion differ, there are cases when the recording dots for the text portion and the image portion overlap whether the quantization method is error diffusion processing or dithering.

Figure 12:
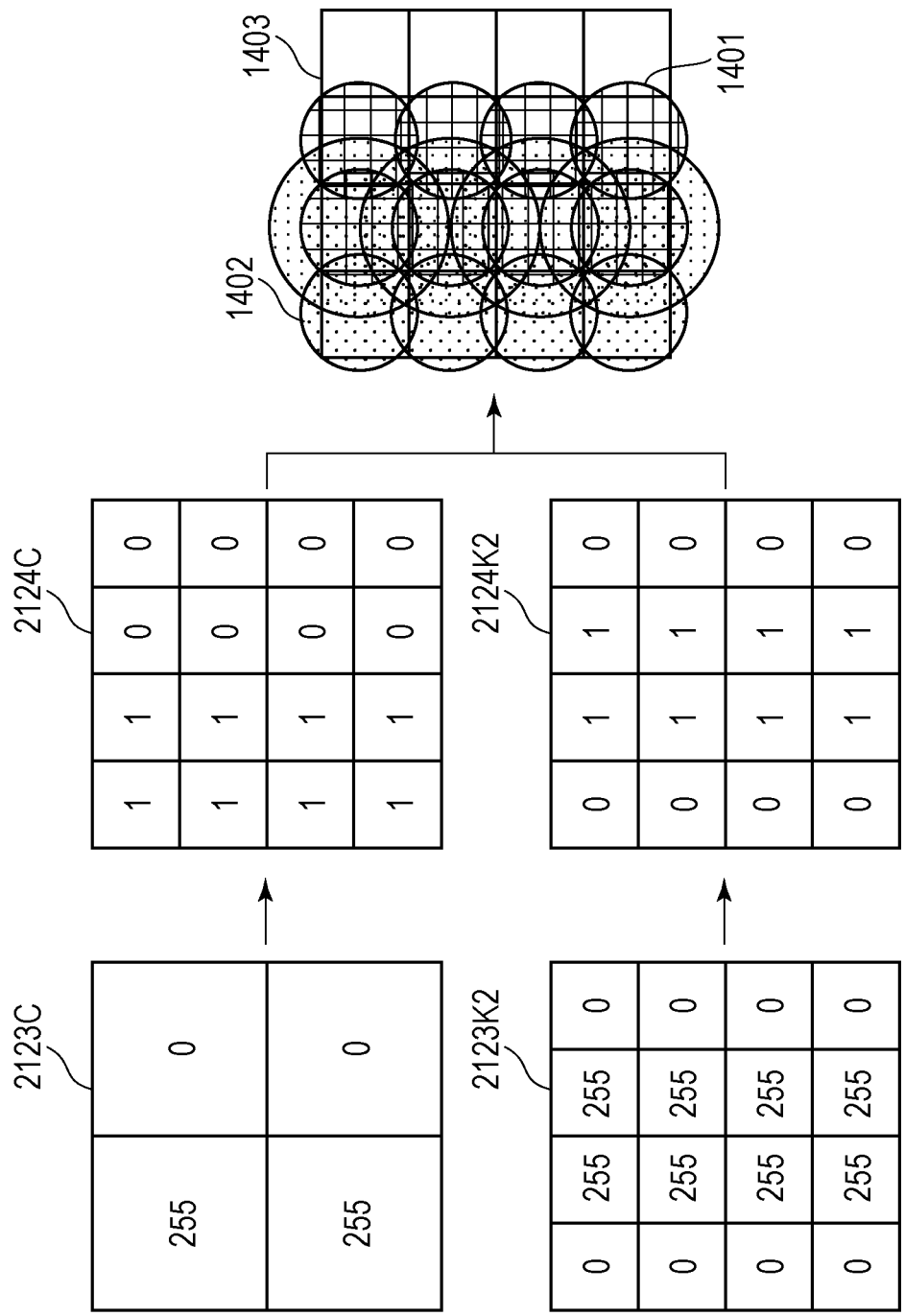
FIG. 12 is a diagram describing a problem regarding a second embodiment.

FIG. 12 is a diagram describing the problem regarding the present embodiment. This embodiment will describe an example in which CMYK ink is used for the image portion, and black text using K ink is extracted for the text portion, but as previously described, text other than black text can be extracted for the text portion.

Figure 13A:
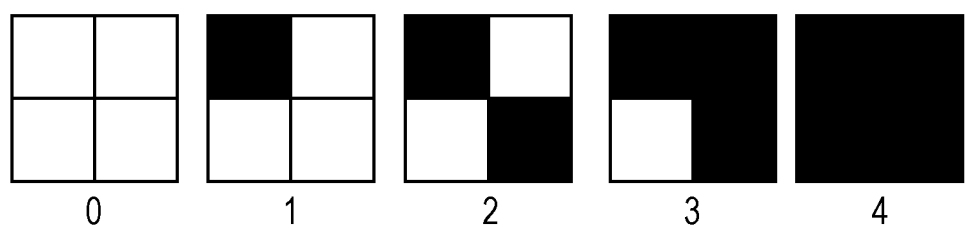
FIGS. 13A and 13B are diagrams illustrating a dot arrangement pattern.
Figure 13B:
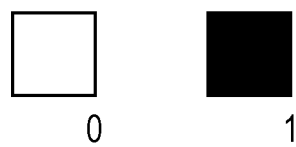

FIG. 12 is a diagram illustrating a case when the recording dots for the C ink of the image portion overlaps with the recording dots for the K ink of the black text portion. The first pixel in a low resolution C ink color concentration level buffer 2121C for a low resolution image portion is set to a pixel 2123C, and each pixel represents the C ink concentration level value. The first pixel in the C ink data buffer 2122C for the image portion is set to a pixel 2124C, and each pixel represents the on state (1) or the off state (0) for the recording dot. When quantizing the image portion into five levels of pixels in a 2×2 configuration, and the ink color concentration level is 255, a quantization pattern as represented by reference numeral 4 in FIG. 13A is selected. When the ink concentration level is 0, a quantization pattern as represented by reference numeral 0 in FIG. 13A is selected. The first pixel in the K ink color concentration level buffer 2121K2 is set to a pixel 2123K2, and each pixel represents the K ink color concentration level value. The first pixel in the K ink data buffer 2122K2 for the text portion is set to a pixel 2122C2, and each pixel represents the on state (1) or the off state (0) for the recording dot. When quantizing and the ink color concentration level is 255, a quantization pattern as represented by reference numeral 1 in FIG. 13B is selected. When the ink concentration level is 0, a quantization pattern as represented by reference numeral 0 in FIG. 13B is selected. Returning to FIG. 12, reference numeral 1401 is a diagram illustrating C ink recording dots 1402 and K ink recording dots 1403 recording onto the recording medium 106, and C ink recording dots and K ink recording dots overlap.

Figure 14:
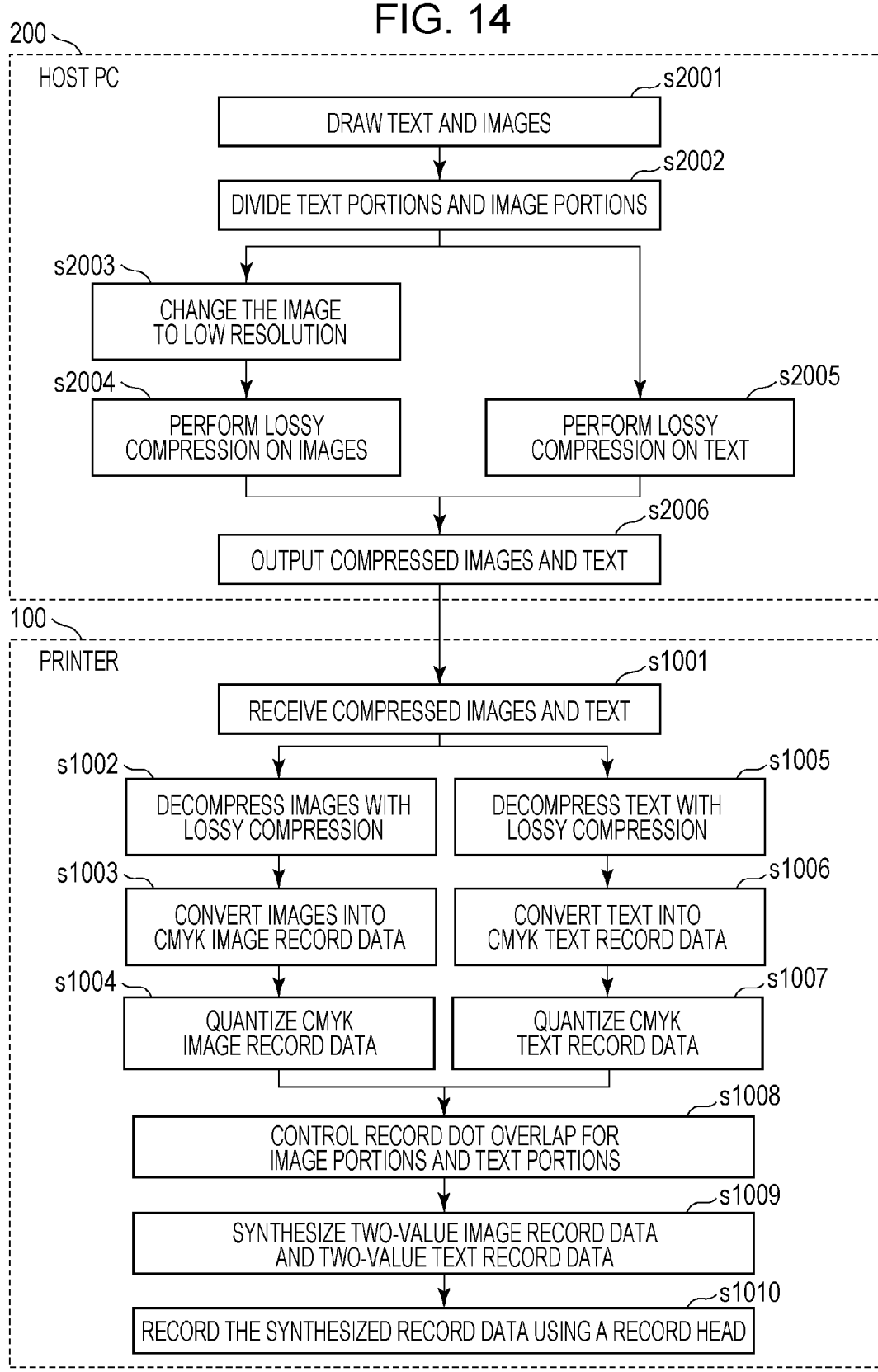
FIG. 14 is a flowchart for an image processing according to the second embodiment.

FIG. 14 is a flowchart illustrating an example configuration of the present embodiment. The difference with the flowchart in FIG. 4 according to the first embodiment is the addition of step s2003. First, the host PC 200 performs processing of steps s2001 through s2006. The processing for steps other than s2003, s2004, and s2006 are similar to the steps regarding the first embodiment, and so their descriptions are omitted.

At step s2003, processing is performed on the divided multi-value image data to reduce the resolution and generate the low resolution image data. At step s2004, the low resolution image data is compressed in a lossy compression format. At step s2006, the compressed low resolution image data and the text data compressed in a lossless format at step s2005 is sent to the printer 100.

Next, the printer 100 performs the processing for steps s1001 through s1010. The details of the processing different from the first embodiment will be described next. At step s1001, the compressed low resolution image data and text data is received from the host PC 200. At step s1002, the low resolution image data with lossy compression is rendered. At step s1003, the rendered multi-value low resolution image data is converted to multi-value low resolution CMYK ink color data. At step s1004, the multi-value low resolution CYMK ink color data is quantized to reduce the gradation level and generate two-value CMYK record data.

Next, the preferable processing for each step will be described in detail. At step s2003, processing is performed on the divided image data to reduce the resolution.

Figure 15:
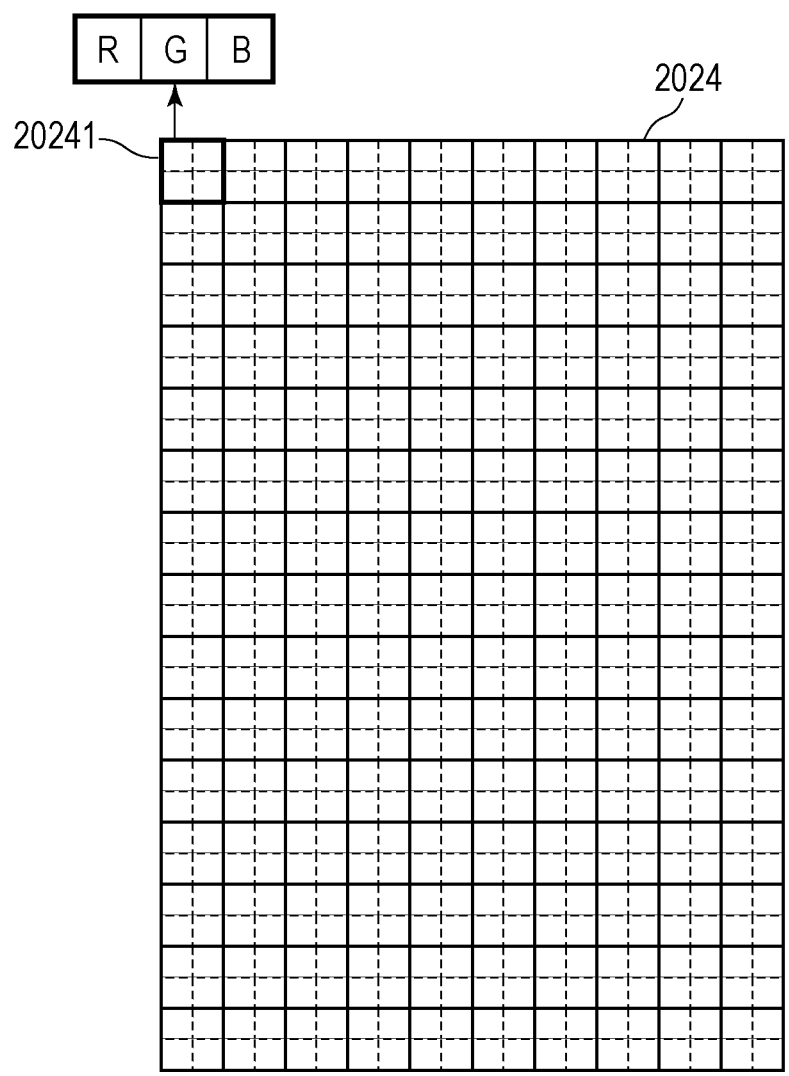
FIG. 15 is a diagram illustrating a page buffer representing a low resolution processing according to the second embodiment.

FIG. 15 illustrates a low resolution image page buffer set in the RAM 202 of the host PC 200. A low resolution image page buffer 2024 has the regions of horizontal image pixels and vertical image pixels half the amount of those in the image page buffer 2023, and the first pixel is a pixel 20241. RGB values corresponding to each pixel in the low resolution image page buffer 2024 are stored.

At the aforementioned step s2003, the image data in the image page buffer 2023 is reduced, and the low resolution image data is generated in the low resolution image page buffer. The straight lines in the low resolution image page buffer 2024 represent boundaries of reduced image pixels, and the dotted lines represent boundaries of image pixels in the corresponding image page buffer in FIG. 8A. According to the present embodiment, the reduction ratio for both horizontal and vertical pixels is 1/2, and each pixel in the 2×2 configuration in the image page buffer corresponds to one pixel in the low resolution image page buffer.

As the specific reduction processing method, the average value of the four pixels including the first pixel 20231, the right pixel, lower pixel, and lower-right pixel in the image page buffer in FIG. 8A is calculated, which becomes the pixel value for the first pixel 20241 in the low resolution image page buffer in FIG. 15. This same reduction processing is applied all pixels in the low resolution image page buffer using the pixels of the corresponding image page buffer. It is preferable that the reduction ratio used during the reduction processing be some integer fraction of one. This because periodic noise such as moiré occurs if an integer fraction of one is not used for the reduction processing. Further, an integer multiple can be used for the enlargement processing described later performed at step s1004 in the printer 100, so processing is simple, and ultimately good image quality is obtained. More preferably, if the reduction ratio is a fraction of some power of 2, division is not needed for the calculation of the average value, which enables the calculation by bit shift processing to be performed quickly.

Returning to the flow, at step s2004, the low resolution image data is compressed into a lossy compression format. According to the present embodiment, the horizontal and vertical image pixels are already reduced by ½, so this result in an amount of data at least ¼ of the original amount. Therefore, there are cases in which no further compression is needed depending on the balanced between printer speed and the transfer speed. If the horizontal and vertical pixels are reduced by ⅓, the amount of data is further reduced to ⅑. If reduced by ¼, the amount of data is further reduced to 1/16. At step s2006, the compressed image data and text data is sent to the printer 100.

As previously described, by using the low resolution image data and text data that is not reduced, the amount of transfer data is significantly reduced while still maintaining black text quality. By using a lossless compression format for the image portion and a lossy compression format for the black text portion, it may also be possible to maintain the black text quality while reducing the amount of data transferred. In this way, image portions and text portions are separate types of data, which enables a configuration applying the preferable compression format to each type of data.

At step s1001, the compressed low resolution image data and text data is received from the host PC 200. In this case, the compressed low resolution image data is processed at step s1002, and the compressed text data is processed at step s1005. If compression processing is not performed at the host PC 200, step s1002 is skipped for low resolution image data, and processing proceeds to step s1003. Step s1005 is skipped for text data, and processing proceeds to step s1006.

At step s1002, the low resolution image data with lossy compression is rendered. In this case, the rendering method corresponds to the lossy compression format used at step s2004 performed by the host PC 200. According to the present embodiment, the data compressed in the JPEG format is decoded. The decoded data is stored in the low resolution image page buffer (not illustrated) in the RAM 212 in the printer 100 in the same format as that for the low resolution image page buffer 2024 illustrated in FIG. 15.

At step s1003, the opened low resolution image data is converted to low resolution CMYK ink color data.

Figure 16A:
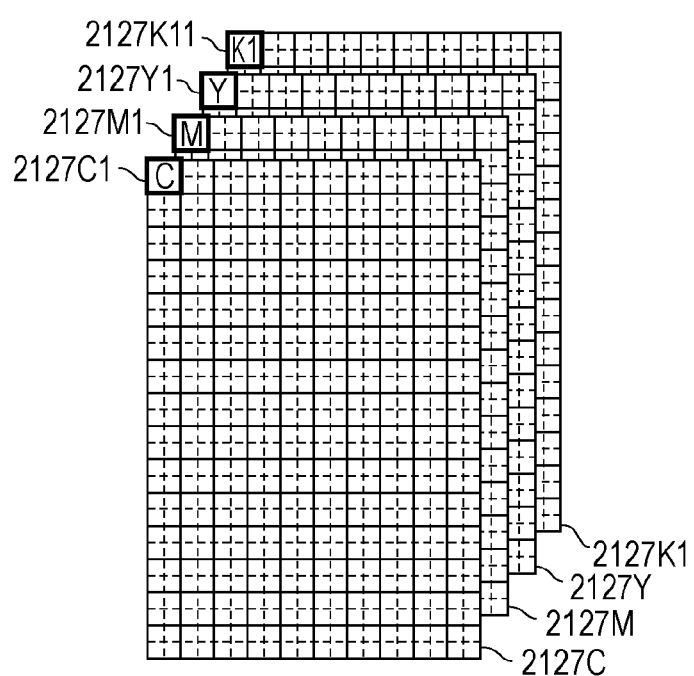
FIGS. 16A and 16B are diagrams illustrating a page buffer representing a low resolution processing according to the second embodiment.
Figure 16B:
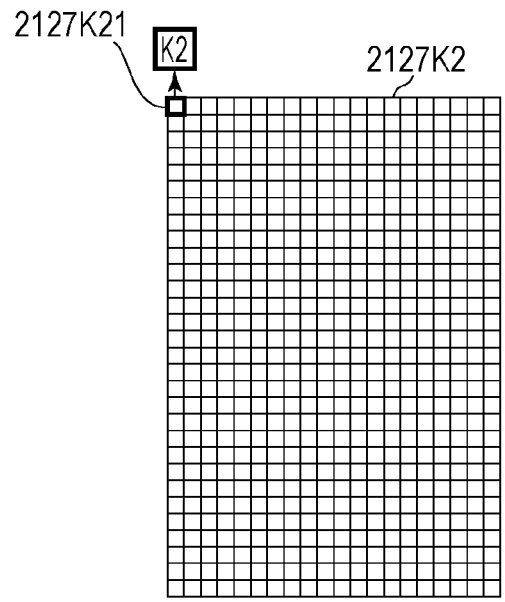

FIG. 16A illustrates a low resolution CMYK ink color concentration level buffer for image portions and FIG. 16B illustrates a K ink color buffer for text portions set in the RAM 212 in the printer 100. The low resolution CMYK ink color concentration level buffer for image portions is configured with a low resolution C ink color concentration level buffer 2127C, an low resolution M ink color concentration level buffer 2127M, a low resolution Y ink color concentration level buffer 2127Y, and a low resolution K ink color concentration level buffer 2127K. The first pixel in the low resolution C ink color concentration level buffer 2127C is set to a pixel 2127C1, and the C ink color concentration level value is stored for each pixel. This applies in the same way for the M ink, Y ink, and K ink. These four ink color concentration level buffers all have the same regions of vertical image pixels and horizontal image pixels as the low resolution image page buffer 2024. Each pixel is represented by 8-bit multi-value information. Pixels have a one-to-one correspondence, and so the RGB data for the first pixel 20241 of the image page buffer 2024 in FIG. 15 is converted into CMYK ink color data at step s1004 and stored as pixels 2127C1, 2127M1, 2127Y1, and 2127K11 as in FIG. 16A.

At step s1004, the low resolution CMYK ink color data is quantized to generate the CYMK record data. Any technique such as error diffusion processing or dithering may be used as the quantization method. The record data after quantization is stored in the ink data buffers as in FIGS. 9A through 9D similar to that regarding the first embodiment. The CMYK ink data buffers for the image portion in FIGS. 9A and 9C all have the same regions of vertical image pixels and horizontal image pixels as the input image page buffer 2021. Compared to the low resolution CMYK ink color data buffers, the number of horizontal and vertical pixels is doubled. This is because the pixels in a 2×2 configuration are quantized by 5 levels during the quantization of each type of ink color data at step s1004 according to the present embodiment. This magnification is decided so as to correspond with the reduction ratio used when performing the resolution reduction processing at step s2003 at the host PC 200.

FIGS. 13A and 13B illustrate examples of quantization according to the present embodiment. FIG. 13A illustrates a quantization pattern of quantizing each type of ink color data at step s1004. According to the present embodiment, the same quantization pattern is used for all ink colors, but image quality can be improved by using a different quantization pattern for each ink color of for each pixel position.

At step s1008, control is performed so that the recording dots for the image record data do not overlap with the record data for the text portion. Similar to the first embodiment, the record data for the text portion and the image portion can be generated so that the record data for the image portion indicates no ejection for pixels corresponding to pixels for which the record data for the text portion indicates an ejection.

According to the present embodiment, the resolution reduction ratio used at step s2003 at the host PC 200 is ½×½, the enlargement ratio used for the image portion at step s1004 at the printer 100 is 2×2, and the enlargement ratio used for the text portion at step s1006 is 1×1. The relationship between the multiple for the resolution reduction and the enlargement ratio does not have to be inverse. For example, the resolution reduction ratio can be ½×½, the enlargement ratio used for the image portion at step s1004 at the printer 100 can be 4×4, and the enlargement ratio used for the text portion at step s1007 can be 2×2. That is to say, the reduction ratio used for reducing the image portion and the text portion and the enlargement ratio used for enlargement the image portion and the text portion should have a reciprocal relationship.

As previously described and according to the present embodiment, recording dot overlap is controlled on the basis of the text data for the recording dots and the image data for the recording dots, and the resolution between text and images is different. According to the previously described configuration, the amount of data transferred is reduced and the amount of processing performed at the printer is reduced while simultaneously maintaining text recording quality. By controlling the recording dots so that there is no overlap between the image portion and the text portion, image defects such as roller transfer and white haze can be reduced.

Third Embodiment

According to the present embodiment, a method will be described in which control is performed so that there is no overlap in recording dots by mutual reference of the record data for the image portion and the record data for the text portion.

Figure 17:
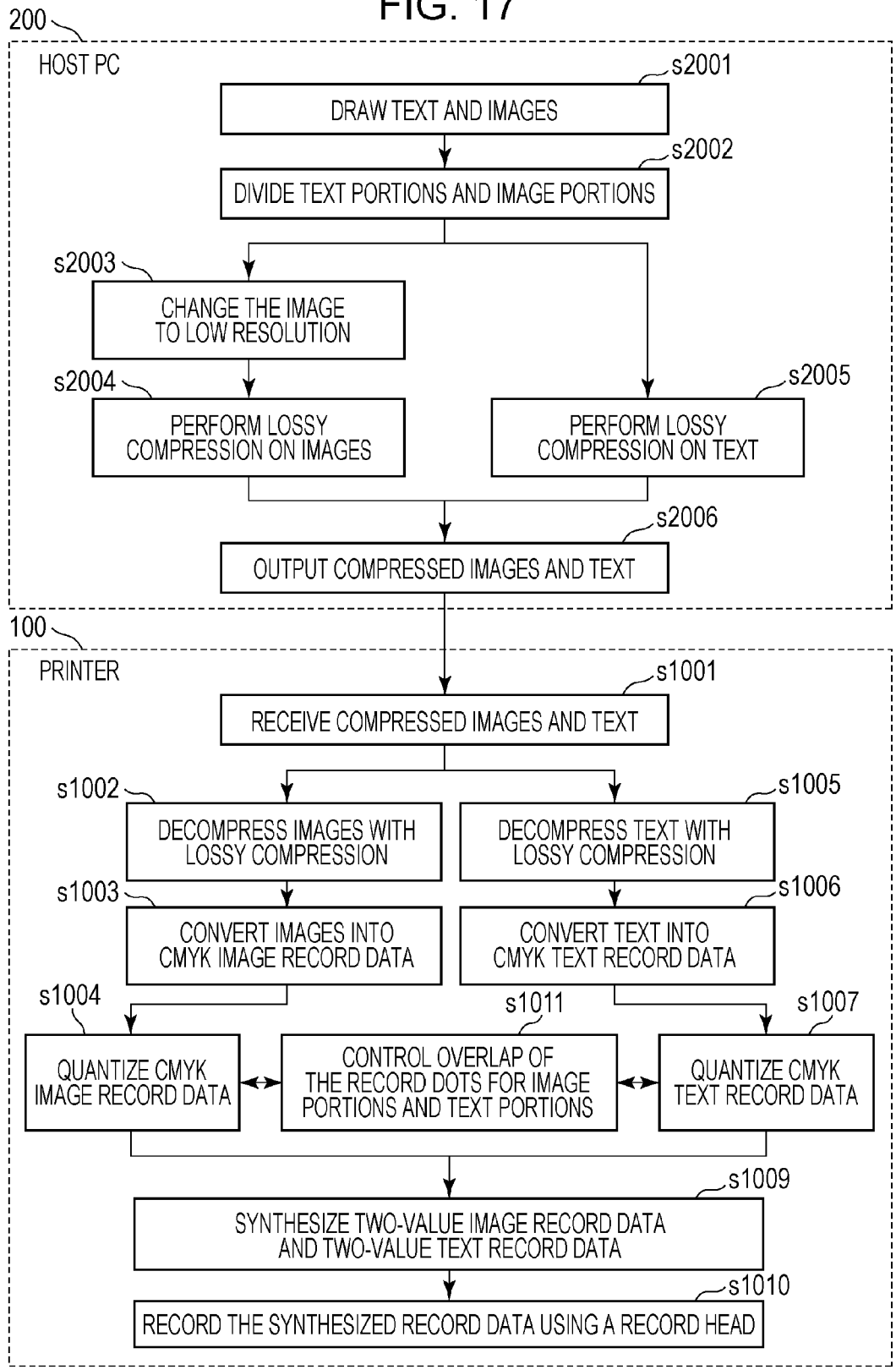
FIG. 17 is a flowchart for an image processing according to a third embodiment.

FIG. 17 is a flowchart illustrating the configuration according to the present embodiment. Step s1008 in FIG. 14 is replaced by step s1011. At step s1011, recording overlap of recording dots between the image portion and the text portion is controlled. This configuration is the same as that regarding the previously described embodiments excluding step s1011, and so those portions are omitted from the description.

Figure 18:
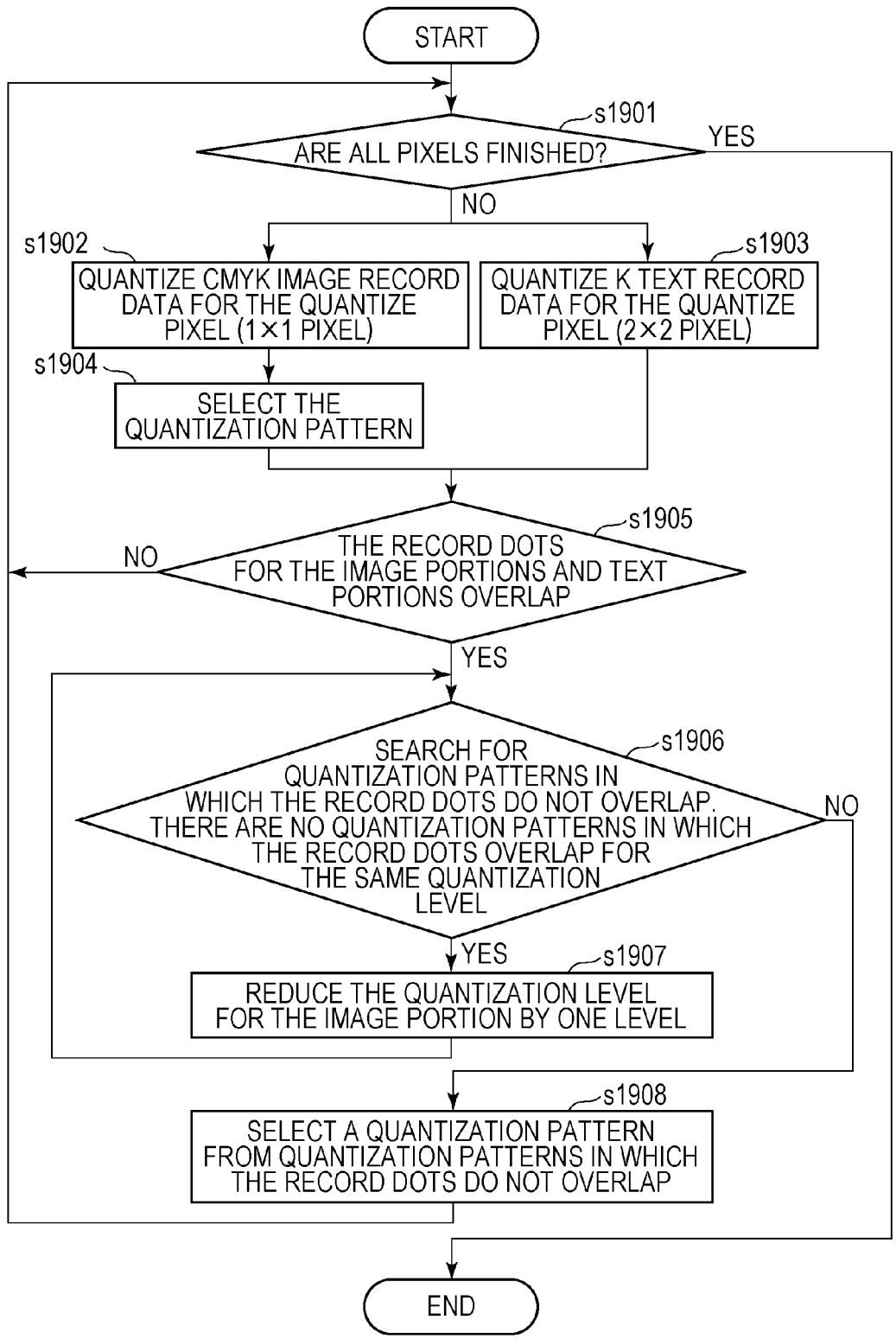
FIG. 18 is a diagram describing an overlap control processing according to the third embodiment.

FIG. 18 is a diagram illustrating an example of the preferable processing for step s1011. At step s1901, a determination is made on whether or not quantization is finished for all pixels regarding the CMYK ink color data for the image portion and the K ink color data for the text portion. At step s1902, the CMYK ink color data for the image portion for pixels in a 1×1 configuration is quantized to 5 levels of quantization. Hereafter, an example of the ink color data and the quantization level will be described.

Ink color data: At least 0 and less than 32→quantization level 0

Ink color data: At least 32 and less than 96→quantization level 1

Ink color data: At least 96 and less than 160→quantization level 2

Ink color data: At least 160 and less than 224→quantization level 3

Ink color data: At least 224 and no more than 255→quantization level 4

Figure 19:
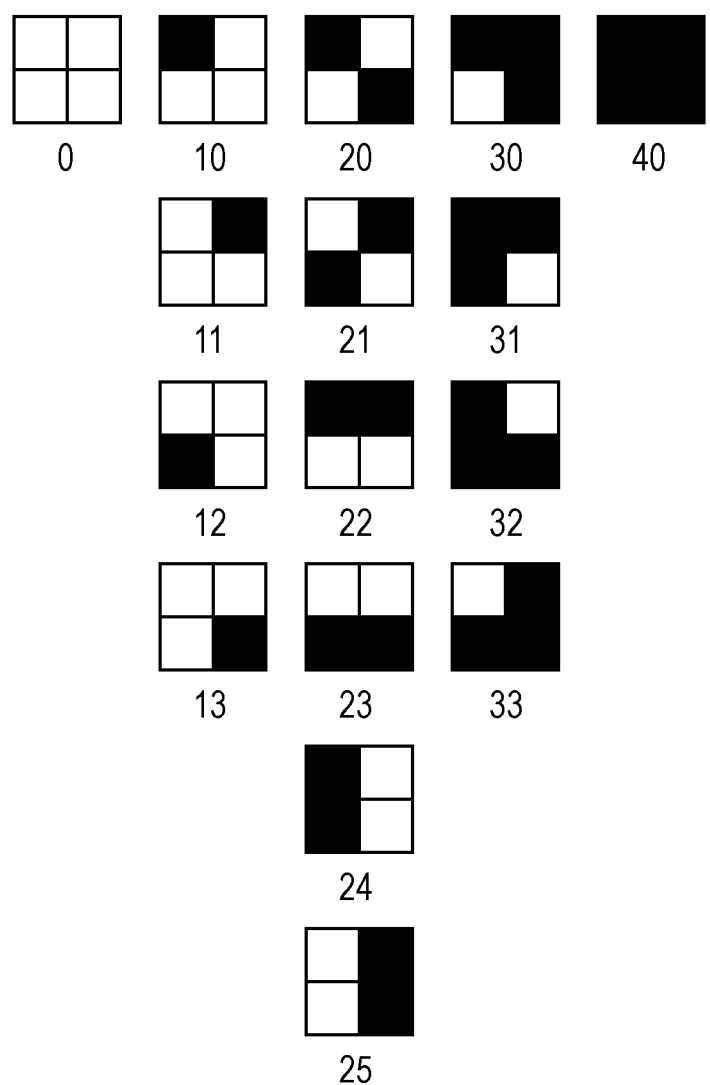
FIG. 19 is a diagram illustrating a quantization pattern according to the third embodiment.

FIG. 19 illustrates an example quantization pattern corresponding to quantization levels.

Quantization level 0→Quantization pattern 0
Quantization level 1→Quantization pattern 10-13
Quantization level 2→Quantization pattern 20-25
Quantization level 3→Quantization pattern 30-33
Quantization level 4→Quantization pattern 40

At step s1903, the K ink color data for the text portion of pixels in a 2×2 configuration is quantized to 2 levels of quantization. According to the present embodiment, the reduction ratio for horizontal and vertical pixels is 1/2 when reducing the resolution of the image portion. For this reason, the pixel size of the text portion corresponding to the image portion pixels in a configuration of 1×1 is 2×2, which results in a total of four pixels for the text portion that are quantized. If the quantization level is zero, the recording dot is turned off, and if the quantization level is 1, the recording dot is turned on.

At step s1904, the quantization pattern is selected in accordance with the quantization level of the CMYK image portion. When there are multiple quantization patterns such as for quantization levels 1 through 3, a random number is applied to select which quantization pattern to use. If only the same quantization pattern is used, texture and other patterns can be seen. Thus, it is preferable to apply a random number so that the quantization pattern is selected randomly.

Figures 20A, 20B:
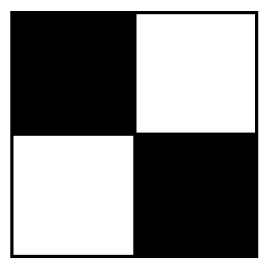
FIGS. 20A and 20B are diagrams illustrating a quantization pattern according to the third embodiment.

Hereinafter, the quantization levels for the CMYK image portion during steps s1905 through s1908 are as follows. The quantization level for C is 1, the quantization level for M is 2, the quantization level for Y is 3, and the quantization level for K is 1. Regarding the quantization patterns illustrated in FIG. 19, the quantization pattern for C is 10, the quantization pattern for M is 22, the quantization pattern for Y is 32, and the quantization pattern for K is 11. FIG. 20 is a diagram illustrating a recording dot pattern for black text portion K pixels in a 2×2 configuration. The black pixels represent recording dots that are on, and the white pixels represent recording dots that are off.

At step s1905, the CMYK quantization pattern for the image portion pixels in a 1×1 configuration and the recording dot pattern for the text portion K pixels in a 2×2 configuration are compared to determine whether or not there is overlap in the recording dots. The quantization pattern for C is 10, and so this results in a determination that there is recording dot overlap when compared with the recording dot pattern for the text portion. The quantization pattern for M is 22, and the quantization pattern for Y is 32, so this results in a determination that there is recording dot overlap when compared with the recording dot pattern for the black text portion. The quantization pattern for K is 11, and so this results in a determination that there is no recording dot overlap when compared with the recording dot pattern for the text portion.

At step s1906, when there is recording dot overlap between the image portion and the text portion, a quantization pattern is selected in accordance with the CMYK quantization level for the image portion so that there is no recording dot overlap. The quantization level for C is 1, and so there is no recording dot overlap with the text portion if the quantization pattern is 11 or 12. The quantization level for M is 2, and so there is no recording dot overlap with the text portion if the quantization pattern is 21. The quantization level for Y is 3, and so there is recording dot overlap with the text portion regardless of the quantization pattern selected.

At step s1907, processing is performed to lower the quantization level of the CMYK image portion by one. As the quantization level for Y is 3, which results in recording dot overlap with the text portion regardless of the quantization level selected, the quantization level is lowered by one to a quantization level of 2. With a quantization level of 2, the processing at step s1906 is performed again, and a quantization pattern that results in no recording dot overlap is searched. This processing continues until a quantization pattern is found that results in no recording dot overlap.

At step s1908, the quantization pattern with no recording dot overlap is selected. As the quantization pattern for C is selectable between 11 and 12, a random number is applied to select with quantization pattern to use. As the quantization pattern selectable for M is 21, the quantization pattern 21 is used. Similarly, the quantization pattern selectable for Y is 21, and so the quantization pattern 21 is used.

Another method can be used in place of using a random number to select the quantization pattern so long as image degradation such as texture can be reduced.

According to the present embodiment, by referencing the quantized text data when quantizing the image data in this way, the image data is quantized so that there is no overlap with pixels for which the recording dot is on in the text data. As a result, the amount of data transferred is reduced and the amount of processing performed at the printer is reduced while simultaneously maintaining text recording quality. Additionally, the recording dots are not readily changed as compared to the previously described embodiments, which maintains the concentration levels of the image when input.

Fourth Embodiment

According to the present embodiment, a method will be described to provide control such that there is no recording dot overlap by mutual reference of the ink color concentration levels of the CMYK ink color data for the image portion and the ink color concentration levels of the K ink color data for the text portion.

Figure 21:
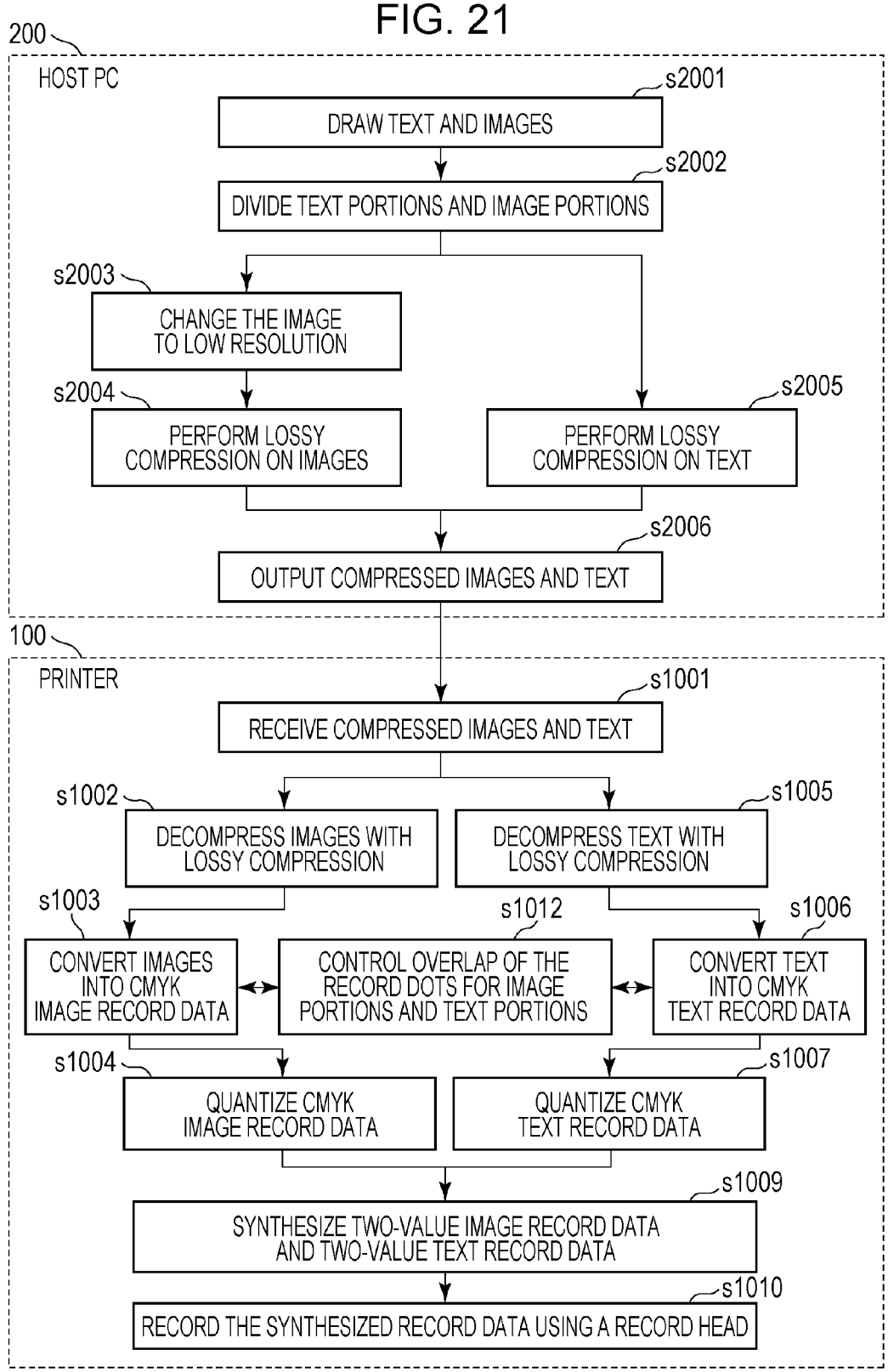
FIG. 21 is a flowchart for an image processing according to a fourth embodiment.

FIG. 21 is a flowchart illustrating the configuration according to the present embodiment. Step s1010 in FIG. 14 is replaced by step s1012. At step s1012, recording dots overlap between the image portion and the text portion is controlled. This configuration is the same as that regarding the previously described embodiments excluding step s1012, and so those portions are omitted from the description.

Figure 22:
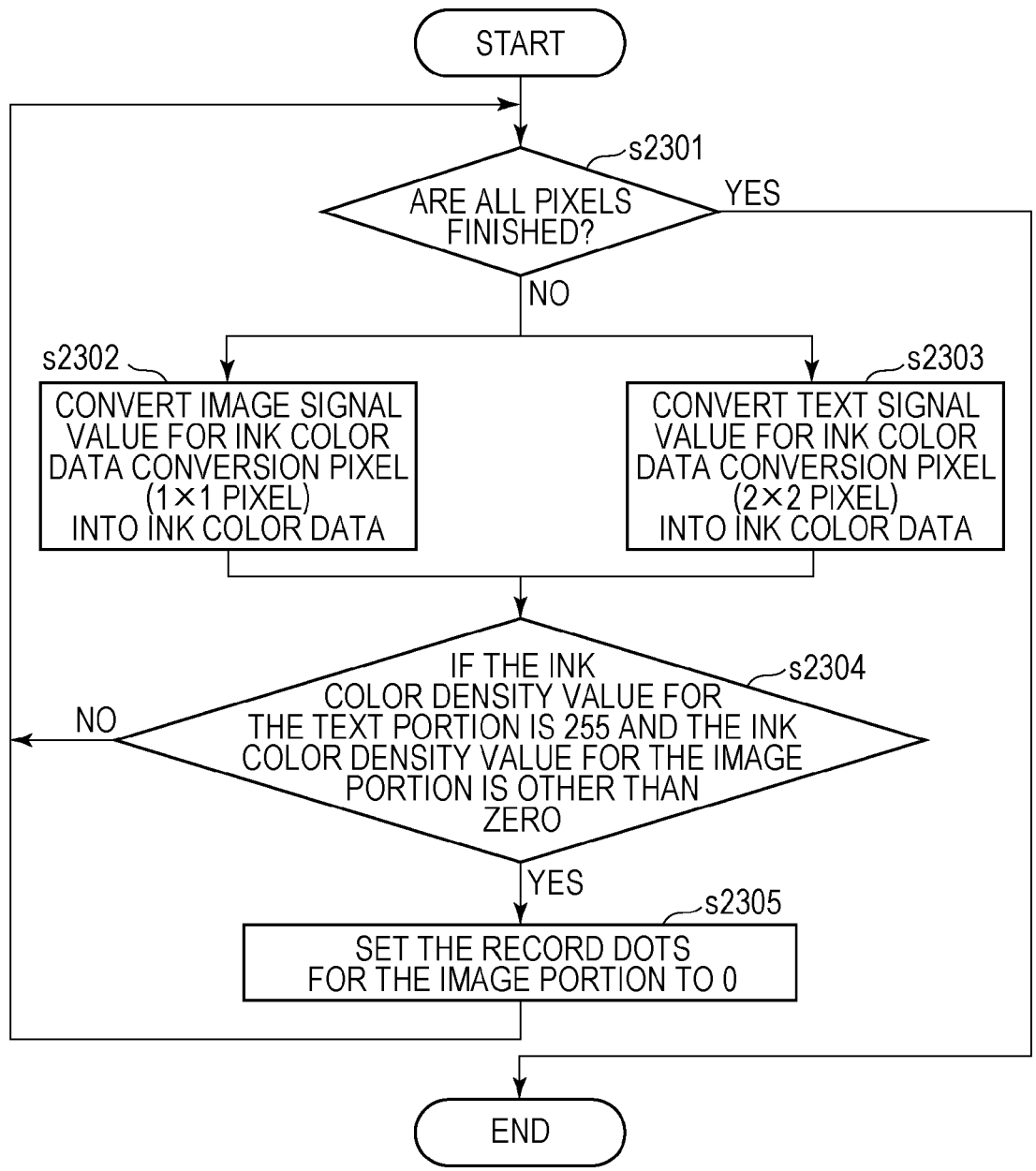
FIG. 22 is a flowchart for an image processing according to the fourth embodiment.

FIG. 22 is a diagram illustrating an example of the preferable processing for step s1012. At step s2301, a determination is made on whether or not processing to convert ink color data for all pixels is finished regarding the image signal values for the image portion and the text signal values for the text portion. At step s2302, processing is performed to convert the image signal values for the image portion pixels in a 1×1 configuration is converted into ink color concentration level values. The ink color concentration level values are 8-bit signal values, which represents a range of values 0 to 255. If the ink color concentration level value is 0, the recording duty is 0%. If the ink color concentration level value is 255, the recording duty is 100%.

At step s2303, processing is performed to convert the text signal values for the text portion pixels in a 2×2 configuration is converted into ink color concentration level values. The ink concentration level values are 8-bit signal values, which represents a range of values 0 to 255. An ink color concentration level value of 0 represents that the recording dot is off. An ink color concentration level value of 255 represents that the recording dot is on.

Hereinafter, steps s2304 through s2305 will be described in which the ink concentration level value for C is 64, the ink color concentration level value for M is 150, the ink color concentration level value for Y is 200, and the ink color concentration level value for K is 64 regarding the CMYK ink color data for the image portion. Regarding the quantization level corresponding to the CMYK ink color concentration level values, the quantization level for C is 1, the quantization level for M is 2, the quantization level for Y is 3, and the quantization level for K is 1. The ink color concentration level values illustrated in FIG. 20 represent ink color data for the text portions K pixels in a 2×2 format. An ink color concentration level value of 255 in FIG. 20 represents a quantization level of 1. An ink color concentration level value of 0 represents a quantization level of 0.

At step s2304, the ink color data for image portion CMYK pixels in a 1×1 configuration and the ink color data for text portion pixels K in a 2×2 configuration are compared. If the ink color concentration level value for the text portion is 255, a determination is made on whether or not the ink color concentration level value for the ink portion is 0. If the ink color concentration level value for the image portion is not 0 when the ink color concentration level value for the text portion is 255, there is potential for recording dot overlap between the image portion and the text portion. As the ink color concentration level value for C is 64, and the quantization level is 1, there is recording dot overlap if quantization pattern 10 or 13 is selected from the quantization patterns 10 through 13 for a quantization level of 1 as illustrated in FIG. 19. Similarly, as the ink color concentration level value for M is 150, and the quantization level is 2, there is recording dot overlap if quantization pattern 20, 22, 23, 24, or 25 is selected from the quantization patterns 20 through 25 for a quantization level of 2 as illustrated in FIG. 19. Similarly, as the ink color concentration level value for Y is 200, and the quantization level is 3, there is recording dot overlap if any of the quantization patterns 30 through 33 is selected for a quantization level of 3 as illustrated in FIG. 19. Similarly, as the ink color concentration level value for K is 64, and the quantization level is 1, there is recording dot overlap if quantization pattern 10 or 13 is selected from the quantization patterns 10 through 13 for a quantization level of 1 as illustrated in FIG. 19. In this way, a determination can be made on whether or not there is potential for recording dot overlap between the image portion and the text portion after the ink color data has been converted. There is no recording dot overlap between the image portion and the text portion when the ink color concentration level value for the image portion is 0. For this reason, a determination is made on whether or not the ink color concentration level value for the image portion is 0.

At step s2305, the ink color concentration level value for the image portion is set to 0.

If dithering is used for the quantization processing at steps s1004 and s1007, recording dot overlap between the image portion and text portion can be avoided. However, if error diffusion processing is used for quantization processing, there are cases in which recording dot overlap cannot be avoided. With error diffusion processing, quantization errors are propagated to peripheral pixels, and so there is a potential that the recording dot is turned on for pixels with an ink color concentration level value of 0 at step s1012. In regard to this, according to the configuration of the present embodiment, the potential for recording dot overlap can be reduced.

Other Embodiments

According to the previously described embodiments, black text was determined when R=G=B=0, however, achromatic text can be determined when R=G=B. In this case, the buffer pixel values are 8=bit data. According to this method, high resolution recording can be achieved for gray text while also reducing degradations in text quality.

According to the previously embodiments, the example given included quantizing 256-value (256 gradations) data into two-value (2 gradations), but these values are not limited thusly. The number of gradations reduced by quantization is not limited as long as the number of gradations is an integer. Ink data can have bit depths other than 2, and so data can be quantized into multi-value data representing 3 or more gradations as long as the recording apparatus can eject ink on the basis of multi-value data. In addition, it is not necessary to include a step to divide the text data and the image data such as in step s2002 if each type of data is obtained separately. The number of gradations between the text data and image data can be different.

According to the previously described embodiments, the example given used a full-line type of recording apparatus, but the recording apparatus to which the present subject matter can be applied is not limited thusly. For example, the present subject matter is applicable to a so-called serial type of recording apparatus that forms images by scanning the recording head or scanner in a direction intersecting the transport direction of the recording medium. Multiple colors of ink droplets can be ejected from a single recording head, and a nozzle arrangement corresponding to multiple colors of ink droplets can be disposed on one ejection substrate. Nozzles capable of ejecting ink droplets of multiple sizes can also be used.

According to the previously described embodiments, the examples given are provisioned with the four CMYK colors of ink in which the K ink is used for both text and images, but separate ink may be used for the text and images. In this case, composite processing of the image record data and the text record data such as that at step s1009 in FIG. 4 is not necessary. In addition, a permeating ink black ink K1 can be used as the image ink, and a black ink K2 that stays on top of the recording medium can be used as the text ink. To record even sharper text, it is preferable if the black ink K2 that stays on top of the recording medium has a lower penetrability to the recording medium than the permeating type black ink K1. For example, dye ink using dye as the coloring agent can be used for the permeating type black ink K1, and pigment ink using pigment as the coloring agent can be used as the black ink K2 that stays on top of the recording medium.

The configuration can record by using only black (K) ink for text, and cyan (C), magenta (M), and yellow (Y) inks are used for images. In this case, K data can be generated as the text ink data, and CMY data can be generated as the image data, which negates the necessity to composite the text record data and image record data.

According to the previously embodiments, image record data for the corresponding pixel was generated to represent a non-ejection regarding all pixels of the text record data representing ejections, but this is not necessary for all pixels. The image record data for pixels representing ejections can be changed to data for pixels representing non-ejections at a predetermined ratio.

As previously described, by arranging image portion ink dots to the text portion ink dots exclusively, degradations in text quality due to overlaps between ink dots for the image portion and ink dots for the text portion can be prevented. These ink dot overlaps are particularly significant at the boundaries of images and text. This also enables reduction of the occurrence of image degradations due to ink bleeding as ink tends to overflow due to ink dot overlaps, and image defects due to contamination of ink in the printer due to ink not fully transferring to the recording medium.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-133531, filed Jun. 26, 2013, which is hereby incorporated by reference herein in its entirety.

What is claimed is:

1. An image processing method to record images on a recording medium using a recording head that ejects ink, the image processing method comprising:
generating N-value (N is an integer of 3 or more) text data and M-value (M is an integer of 3 or more) image data on the basis of input data;
generating text record data of L values (L is an integer of 2 or more that is less than N) representing the ejection or absence of ejection of ink by quantizing the N-value text data; and
generating image record data of K values (K is an integer of 2 or more that is less than M) representing the ejection or absence of ejection of ink by quantizing the M-value image data;
wherein the text record data and the image record data are generated so that the image record data indicates no ejection of ink for pixels corresponding to pixels for which the text record data indicates an ejection of ink.

2. The image processing method according to claim 1, wherein error diffusion processing is used for at least one of the quantization of the N-value text image data and the quantization of the M-value image data.

3. The image processing method according to claim 1, wherein the N-value text data and the M-value image data have different resolutions, and the text record data and the image record data have the same resolution.

4. The image processing method according to claim 1, wherein the N-value text data has a higher resolution than the M-value image data.

5. The image processing method according to claim 1, wherein the text record data and the image record data are generated so that the image record data indicates no ejection for pixels corresponding to all pixels for which the text record data indicates an ejection.

6. The image processing method according to claim 1, wherein the ink corresponding to the text record data is black ink.

7. The image processing method according to claim 1, wherein the ink corresponding to the image record data comprises cyan ink, magenta ink, and yellow ink.

8. The image processing method according to claim 1, wherein the recording head may eject a plurality of inks, and the ink corresponding to the text record data is different from the ink corresponding to the image record data.

9. The image processing method according to claim 8, wherein the ink corresponding to the text record data has a lower penetrability than the ink corresponding to the image record data.

10. The image processing method according to claim 1, wherein the image record data is generated as data that indicates the absence of ejection of cyan ink, magenta ink, and yellow ink corresponding to pixels in the text record data indicating the ejection of black ink when the text record data is data representing the ejection of black ink, and the image record data is data that represents the ejection of black ink, cyan ink, magenta ink, and yellow ink.

11. The image processing method according to claim 1, wherein the input data includes attribute data representing an attribute of each pixel, and the N-value text data is generated by extracting pixels for which the attribute data represents a text attribute.

12. The image processing method according to claim 11, wherein the input data includes color data representing the color of each pixel, and the N-value text data is generated by extracting pixels for which the attribute data represents the text attribute and the color data represents black.

13. The image processing method according to claim 12, wherein the color data includes RGB values, and the pixels for which the color data represents black have RGB values of zero.

14. The image processing method according to claim 1, wherein the variable L and the variable K correspond to the same number.

15. The image processing method according to claim 1, wherein the variable L and the variable K correspond to the number 2.

16. The image processing method according to claim 1, further comprising:
ejecting ink from the recording head on the basis of the text record data and the image record data.

17. An image processing apparatus configured to perform image processing to record images on a recording medium using a recording head that ejects ink, the image processing apparatus comprising:
a generating unit configured to generate N-value (N is an integer of 3 or more) text data and M-value (M is an integer of 3 or more) image data on the basis of input data, generate text record data of L values (L is an integer of 2 or more that is less than N) representing the ejection or absence of ejection of ink by quantizing the N-value text data, and generate image record data of K values (K is an integer of 2 or more that is less than M) representing the ejection or absence of ejection of ink by quantizing the M-value image data,
wherein the generating unit generates the text record data and the image record data so that the image record data indicates no ejection of ink for pixels corresponding to pixels for which the text record data indicates an ejection of ink.

18. A recording system including an image processing apparatus and a recording apparatus, wherein the image processing apparatus includes
- a first generating unit configured to generate N-value (N is an integer of 3 or more) text data and M-value (M is an integer of 3 or more) image data on the basis of input data,
- a compression unit configured to compress the N-value text data and the M-value image data,
- a transfer unit configured to transfer the compressed N-value text data and the M-value image data, wherein the recording apparatus includes
- a receiving unit configured to receive the compressed N-value text data and the M-value image data,
- a rendering unit configured to render the compressed N-value text data and the M-value image data,
- a second generating unit configured to generate text record data of L values (L is an integer of 2 or more that is less than N) representing the ejection or absence of ejection of ink by quantizing the N-value text data, and generate image record data of K values (K is an integer of 2 or more that is less than M) representing the ejection or absence of ejection of ink by quantizing the M-value image data, and
- a recording unit configured to record images onto a recording medium on the basis of the text record data and the image record data, and wherein the second generating unit generates the text record data and the image record data so that the image record data indicates no ejection for pixels corresponding to pixels for which the text record data indicates an ejection.

19. An image processing method to perform image processing to record images on a recording medium using a recording head that ejects ink, the image processing method comprising:
- receiving two-value text data representing the ejection or absence of ejection of ink and multi-value value image data; and
- generating two-value image data that represents the absence of ejection of ink corresponding to pixels for which the two-value text data represents the ejection of ink on the basis of the two-value text data and the multi-value image data.

20. The image processing method according to claim 19, wherein the multi-value image data is converted to two-value data by error diffusion processing, and the converted two-value data is changed to represent the absence of ejection of ink corresponding to pixels for which the two-value text data represents the ejection of ink during generating of two-value image data.

21. The image processing method according to claim 1, further comprising:
- judging whether or not there is an overlap in the recording dots by text record data representing the ejection or absence of ejection of ink generated by quantizing the N-value text data and tentative image record data representing the ejection or absence of ejection of ink by quantizing the M-value image data, and if it is judged that there is an overlap in the recording dots by the text record data and the tentative image record data, changing the tentative image record data such that there is no overlap in the recording dots by the text record data and the changed image record data.

* * * * *